United States Patent
Sakaki

(10) Patent No.: US 8,844,029 B2
(45) Date of Patent: Sep. 23, 2014

(54) RISK MODEL CORRECTING SYSTEM, RISK MODEL CORRECTING METHOD, AND RISK MODEL CORRECTING PROGRAM

(75) Inventor: Hiroshi Sakaki, Tokyo (JP)

(73) Assignee: NEC Corporation, Tokyo (JP)

( * ) Notice: Subject to any disclaimer, the term of this patent is extended or adjusted under 35 U.S.C. 154(b) by 854 days.

(21) Appl. No.: 12/599,773

(22) PCT Filed: Apr. 22, 2008

(86) PCT No.: PCT/JP2008/057777
§ 371 (c)(1),
(2), (4) Date: Jan. 14, 2010

(87) PCT Pub. No.: WO2008/139856
PCT Pub. Date: Nov. 20, 2008

(65) Prior Publication Data
US 2010/0162401 A1 Jun. 24, 2010

(30) Foreign Application Priority Data
May 11, 2007 (JP) .................................. 2007-126752

(51) Int. Cl.
*G06F 21/00* (2013.01)
*G06Q 10/10* (2012.01)
(52) U.S. Cl.
CPC ...................................... *G06Q 10/10* (2013.01)
USPC ............................................ 726/22; 726/25
(58) Field of Classification Search
USPC ..................................................... 726/22–25
See application file for complete search history.

(56) References Cited

U.S. PATENT DOCUMENTS

| 2003/0093696 A1 | 5/2003 | Sugimoto |
| 2004/0210421 A1* | 10/2004 | Kataoka ..................... 702/186 |
| 2006/0242711 A1* | 10/2006 | Anzai et al. .................. 726/25 |

FOREIGN PATENT DOCUMENTS

| JP | 2002-157414 A | 5/2002 |
| JP | 2003-150748 A | 5/2003 |
| JP | 2004-302709 A | 10/2004 |
| JP | 2005-128599 A | 5/2005 |
| JP | 2005-135239 A | 5/2005 |
| JP | 2005-234840 A | 9/2005 |
| JP | 2006-285825 A | 10/2006 |

* cited by examiner

*Primary Examiner* — Edward Zee
*Assistant Examiner* — Chi Nguy
(74) *Attorney, Agent, or Firm* — Sughrue Mion, PLLC

(57) ABSTRACT

A risk value is calculated to suit a state and environment of an analysis target system, by presenting data for determining whether or not a calculated risk is correct, and presenting portions for parameters to be changed such as weights related to a threat, a vulnerability and a measure contained in the risk model. A risk model correcting system includes a risk model storage section that stores as a risk model, a correspondence relationship between threats constituting a risk and a measure for each threat, and parameters including weights of them; an information collecting section that collects data of an analysis target system; an influence degree calculating section that calculates an influence degree of the existence or non-existence of the measure on a result of the calculation of the risk value; a risk analyzing section that performs a risk analysis on the analysis target system; and a reason presenting section that present a reason of the risk calculation by presenting the influence degree calculated by the risk degree calculating section.

17 Claims, 20 Drawing Sheets

Fig. 10

| THREAT | | | MEASURE | |
|---|---|---|---|---|
| ID | KIND OF THREAT | WEIGHT | ID | EFFECT |
| T1 | TAKE OUT INFORMATION BY USING EXTERNAL MEMORY | 0.7 | C1 | 0.9 |
| | | | C2 | 0.7 |
| | | | C3 | 0.6 |
| | | | C8 | 0.3 |
| T2 | TRANSMIT E-MAIL | 0.4 | C3 | 0.4 |
| | | | C5 | 0.9 |
| | | | C8 | 0.3 |
| T3 | TAKE OUT PRINTS | 0.6 | C6 | 0.9 |
| | | | C7 | 0.5 |
| | | | C8 | 0.3 |
| RISK | INFORMATION LEAKAGE | | | |

| MEASURE | |
|---|---|
| ID | KIND OF MEASURE |
| C1 | INHIBIT USE OF EXTERNAL MEMORY |
| C2 | INHIBIT TAKE-IN OF EXTERNAL MEMORY |
| C3 | ENCRYPT FILE |
| C4 | INHIBIT ATTACHMENT OF FILE |
| C5 | INHIBIT USE OF E-MAIL SOFTWARE |
| C6 | INHIBIT PRINT |
| C7 | PRINT WITH PERMISSION |
| C8 | ACQUIRE LOG |

Fig. 11

| PC NAME | CORRESPONDING THREAT | PRACTISED MEASURE |
|---|---|---|
| PC1 | T1 | C2 |
|  | T3 | C7, C8 |
| PC2 | T1 | C2 |
|  | T3 | C7, C8 |

Fig. 12

$$X_{ij} = \begin{cases} X_{ij}=0 & \text{MEASURE } C_{ij} \text{ IS NOT PRACTISED} \\ X_{ij}=1 & \text{MEASURE } C_{ij} \text{ HAS BEEN PRACTISED} \end{cases}$$

$|T_i| = t_i \, (1-(1-(1-C_{i1}X_{i1})(1-C_{i2}X_{i2})) \cdots (1-C_{im}X_{im}))$ RISK VALUE: $|R| = 1-(1-|T_1|)(1-|T_2|) \cdots (1-|T_n|)$

Fig. 13

| THREAT | | | MEASURE | | INFLUENCE DEGREE | | | PRACTICE |
|---|---|---|---|---|---|---|---|---|
| ID | KIND OF THREAT | WEIGHT | ID | EFFECT | VALUE | LEVEL | ORDER | |
| T1 | TAKE OUT INFORMATION BY USING EXTERNAL MEMORY | 0.7 | C1 | 0.9 | 0.63 | HIGH | 1 | |
| | | | C2 | 0.7 | 0.49 | MIDDLE | 3 | DONE |
| | | | C3 | 0.6 | 0.42 | MIDDLE | 4 | |
| | | | C8 | 0.3 | 0.21 | LOW | 7 | |
| T2 | TRANSMIT E-MAIL | 0.4 | C3 | 0.4 | 0.16 | LOW | 9 | |
| | | | C5 | 0.9 | 0.36 | MIDDLE | 5 | |
| | | | C8 | 0.3 | 0.12 | LOW | 10 | |
| T3 | TAKE OUT PRINTS | 0.6 | C6 | 0.9 | 0.54 | MIDDLE | 2 | |
| | | | C7 | 0.5 | 0.30 | LOW | 6 | DONE |
| | | | C8 | 0.3 | 0.18 | LOW | 8 | DONE |
| RISK | INFORMATION LEAKAGE | | | | | | | |

Fig. 14

RISK VALUE : 0.62554

| RISK | THREAT | | | MEASURE | | INFLUENCE DEGREE | | | |
|---|---|---|---|---|---|---|---|---|---|
| | ID | KIND OF THREAT | WEIGHT | ID | EFFECT | VALUE | LEVEL | ORDER | PRACTICE |
| INFORMATION LEAKAGE | T1 | TAKE OUT INFORMATION BY USING EXTERNAL MEMORY | 0.7 | C1 | 0.63 | 0.63 | HIGH | 1 | |
| | | | | C2 | 0.49 | 0.49 | MIDDLE | 3 | DONE |
| | | | | C3 | 0.42 | 0.42 | MIDDLE | 4 | |
| | T2 | TRANSMIT E-MAIL | 0.4 | C5 | 0.36 | 0.16 | MIDDLE | 5 | |
| | T3 | TAKE OUT PRINTS | 0.6 | C6 | 0.54 | 0.54 | MIDDLE | 2 | |

Fig. 15

CORRECTION CANDIDATE FOR DECREASING RISK VALUE

| RISK | THREAT | | | MEASURE | | INFLUENCE DEGREE | | | PRACTICE |
|---|---|---|---|---|---|---|---|---|---|
| | ID | KIND OF THREAT | WEIGHT | ID | EFFECT | VALUE | LEVEL | ORDER | |
| INFORMATION LEAKAGE | T1 | TAKE OUT INFORMATION BY USING EXTERNAL MEMORY | 0.7 ▲▼ | C2 | 0.7 ▲▼ | 0.49 | MIDDLE | 3 | DONE |
| | T2 | TRANSMIT E-MAIL | 0.4 ▲▼ | C5 | 0.9 | 0.36 | MIDDLE | 5 | |
| | | | | C8 | 0.3 | 0.12 | LOW | 10 | |

RISK VALUE BEFORE CHANGE : 0.63  ----▶  RISK VALUE AFTER CHANGE : 0.63

▨ DECREASING VALUE, INCREASING RISK
▨ INCREASING VALUE, INCREASING RISK

▨ DETERMINATION

Fig. 16

CORRECTION CANDIDATE FOR DECREASING RISK VALUE

| RISK | THREAT | | | MEASURE | | INFLUENCE DEGREE | | | PRACTICE |
|---|---|---|---|---|---|---|---|---|---|
| | ID | KIND OF THREAT | WEIGHT | ID | EFFECT | VALUE | LEVEL | ORDER | |
| INFORMATION LEAKAGE | T1 | TAKE OUT INFORMATION BY USING EXTERNAL MEMORY | 0.7 | C1 | 0.9 | 0.63 | HIGH | 1 | |
| | | | | C2 | 0.7 | 0.49 | MIDDLE | 3 | DONE |
| | | | | C7 | 0.5 | 0.30 | LOW | 6 | DONE |
| | T3 | TRANSMIT PRINTS | 0.6 | C8 | 0.3 | 0.18 | LOW | 8 | DONE |

RISK VALUE BEFORE CHANGE : 0.63 ----→ RISK VALUE AFTER CHANGE : 0.63

DECREASING VALUE, INCREASING RISK
INCREASING VALUE, INCREASING RISK

DETERMINATION

Fig. 18

| PC NAME | CORRESPONDING THREAT | PRACTISED MEASURE |
|---|---|---|
| PC1 | T1 | C2 |
|  | T2 | C4 |
|  | T3 | C6, C8 |
|  | T4 | C9 |

Fig. 19

$$X_{ij} = \begin{cases} X_{ij}=0 & \text{MEASURE } C_{ij} \text{ IS NOT PRACTISED} \\ X_{ij}=1 & \text{MEASURE } C_{ij} \text{ HAS BEEN PRACTISED} \end{cases}$$

$|T_i| = t_i(1-(1-(1-|C_{i1}|X_{i1})(1-|C_{i2}|X_{i2}))\cdots(1-|C_{im}|X_{im}))$ $|C_{ij}| = C_{ij}(1-(1-(1-|T'_1|)(1-|T'_2|)\cdots(1-|T'_m|))$ RISK VALUE : $|R| = 1-(1-|T_1|)(1-|T_2|)\cdots(1-|T_n|)$

Fig. 21

- RISK IS TOO HIGH
    - MEASURES HAVING BEEN PRACTISED WHILE INFLUENCE DEGREES ARE LOW
        - ATTENTION PAID POINTS
            - T2 ⇨ C4
            - T4 ⇨ C9
            - T3 ⇨ C8
        - CORRECTING METHOD
            - INCREASE EFFECTS OF MEASURES OR DECREASE OF MAGNITUDE OF THREAT
    - MEASURES BEING NOT PRACTISED WHILE INFLUENCE DEGREES ARE HIGH
        - ATTENTION PAID POINTS
            - T1 ⇨ C1
            - T1 ⇨ C3
            - T2 ⇨ C5
        - CORRECTING METHOD
            - DECREASE OF MAGNITUDE OF THREAT
- RISK IS TOO LOW
    - MEASURE HAVING HIGH INFLUENCE DEGREES OF PRACTISED MEASURES
        - ATTENTION PAID POINTS
            - T1 ⇨ C2
            - T3 ⇨ C6
        - CORRECTING METHOD
            - INCREASE EFFECTS OF MEASURES OR DECREASE OF MAGNITUDE OF THREAT
    - MEASURE BEING NOT PRACTISED AND HAVING LOW INFLUENCE DEGREE
        - ATTENTION PAID POINTS
            - T2 ⇨ C5
        - CORRECTING METHOD

RISK MODEL CORRECTING SYSTEM, RISK MODEL CORRECTING METHOD, AND RISK MODEL CORRECTING PROGRAM

CROSS REFERENCE TO RELATED APPLICATIONS

This application is a National Stage of International Application No. PCT/JP2008/057777 filed Apr. 22, 2008, claiming priority based on Japanese Patent Application No. 2007-126752 filed May 11, 2007, the contents of all of which are incorporated herein by reference in their entirety.

TECHNICAL FIELD

The present invention relates to a risk model correcting system, a risk model correcting method, and a risk model correcting program, and more particularly, to a risk model correcting system, a risk model correcting method, and a risk model correcting program, in which a risk model is corrected that is used in a risk analysis system evaluating a risk to a computer system.

The present patent application is based on Japanese Patent Application No. 2007-126752, and claims benefit of priority. The disclosure thereof is incorporated herein by reference.

BACKGROUND ART

Nowadays, a security accident such as information leakage is required to be prevented in advance. In order to keep a secure state where the security accident does not occur, a number of measures are applied to an information system. However, it is not easy to evaluate risks in a complicated information system, and also to determine necessary measures. For this reason, there is proposed a risk analysis system that evaluates risks inherent in an information system according to a predetermined risk model.

As a related risk analysis system, there is a system including, for example, a current status analysis input processing section, an asset input processing section, a vulnerability database, a threat database, and a risk calculating section. The risk analysis system operates as follows. Information for determining the existence or non-existence of vulnerability in an analysis target system is inputted by the current status analysis input processing section. On the basis of the inputted information, the vulnerability database is referred to, and the vulnerability is extracted. A threat corresponding to the extracted vulnerability is taken out from the threat database. The risk calculating section calculates a magnitude of a risk from a degree of the vulnerability and a magnitude of threat previously stored in the respective databases. In the risk analysis system described in Japanese Patent Application Publication (JP 2005-135239a) (Paragraphs 0054-0064, and FIG. 1), a relationship between a threat and a vulnerability stored in the threat and vulnerability databases, and their weights correspond to a risk model.

However, in the above-described risk analysis system, a risk inherent in the information system is only evaluated in a predetermined format according to the risk model including predetermined criteria. A risk may be dependent on a circumstance or environment inherent in an information system. In order to analyze such a risk, a system administrator or consultant who is a risk management expert should conduct a hearing with a user about the criteria or system environment to individually change the risk model in advance. However, even if the hearing with the user who is not a risk management expert is conducted, it is difficult to extract sufficient information to produce the risk model. For this reason, in a system in which a risk model is individually changed and then created in advance, the hearing is repeatedly conducted while a risk analyzed result is presented to a user, and thereby the risk model is adjusted.

Japanese Patent Application Publication (JP 2005-135239A) proposes a system in which, by referring to a risk analysis result and a parameter such as a weight of a threat or an effect of a measure used for a risk analysis, a circumstance or environment inherent in a system is reflected on a risk value in the calculation of the risk value.

In the system described in Japanese Patent Application Publication (JP 2005-135239A), an information security management apparatus includes a current status analysis input processing section, an asset input processing section, a vulnerability analyzing section, a threat analyzing section, a value changing section, a risk calculating section, a current status question database, an answer option table, a vulnerability database, and a threat database. The information security management apparatus operates as follows. That is, the current status analysis input processing section inputs a question and an answer about security measures. When a weight of the answer is equal to or more than a predetermined value, the vulnerability analyzing section obtains a vulnerability corresponding to an ID of the question and the weight of the vulnerability from the vulnerability database. The asset input processing section calculates a vulnerability value for each of the vulnerabilities on the basis of a corresponding asset value in an inputted asset list. The threat analyzing section calculates a threat value on the basis of a threat corresponding to an ID of the vulnerability and a weight of the threat. The risk calculating section calculates a risk value for each of the vulnerabilities on the basis of the asset value, the vulnerability value, and the threat value. Further, the value changing section displays a result of the calculation for each of the vulnerabilities and corresponding threat. If the displayed values are disagreed with, a risk analyst can use the value changing section to correct them.

However, with only having a function of changing the calculated values such as the vulnerability value and the threat value, no one knows whether or not these values are correct, and can determine where and how to change. For this reason, in spite of the existence of a serious risk, an accurate risk value may not be calculated to thereby overlook the risk. On the other hand, in spite of the non-existence of the risk, excessive measures may be practised. Also, an administrator or a consultant who is in charge of risk analysis of a plurality of analysis target systems should individually correct the vulnerability value and the threat value to suit a circumstance or environment of each of the analysis target systems, and prepare a risk model for each of the analysis target systems. For this reason, a lot of man-hours are required for the risk analysis, and an error is also likely to occur.

On the other hand, Japanese Patent Application Publication (JP-P2006-285825A) (Paragraph 0125-0134, and FIG. 2) describes an example of a system for producing a risk model even for an unprepared unknown risk to evaluate the risk. A support system for quantifying a risk described in Japanese Patent Application Publication (JP-P2006-285825A) includes: a risk quantity calculating section that calculates a risk quantity; a risk analysis model database that stores risk analysis models including calculation equations and retrieval indexes for risk quantities produced from risk cases; and a risk analysis model retrieving section that retrieves a risk analysis model corresponding to a risk item from the risk analysis model database by acquiring the risk item including a specific description of a risk content to compare the specific description with the retrieval indexes.

The support system for quantifying a risk having such a configuration operates as follows. That is, the risk analysis model retrieving section acquires the risk item including the specific description of the risk content to compare the specific description of the risk content with the retrieval indexes, and thereby retrieves the risk analysis model corresponding to the risk item from the risk analysis model database. Then, the risk calculating section uses the retrieved risk analysis model to calculate the risk quantity.

However, in the conventional support system for quantifying a risk described in the Japanese Patent Application Publication (JP-P2006-285825A), the specific description of the risk content that can be inputted cannot include a parameter such as an effect of a measure, or weight of a threat as in the above-described risk model. For this reason, the support system for quantifying a risk cannot solve a problem of correcting a risk model.

DISCLOSURE OF INVENTION

A problem of the conventional systems as described in Japanese Patent Application Publications (JP 2005-135239A and JP 2006-285825A) is in that, upon adjustment of a calculated risk value, whether or not a calculation result of the risk value is correct is unknown. Even when a parameter such as a magnitude of a threat or an effect of a measure should be changed to suit an environment of an analysis target, no one knows which part of a risk model should be changed. The reason is in that in the conventional system, the magnitude of the effect and the magnitude of the threat that underlie the calculation of the risk value are displayed, and changes of them are only received. Listing up these values for each measure or each threat does not provide any criterion to determine which value is correct. Accordingly, no one can determine where and how to change the risk model. The risk value cannot be calculated to suit an analysis target system by changing the parameter.

Therefore, an object of the present invention is to provide a risk model correcting system that can present data by which it can be determined whether or not a calculated risk is correct.

The risk model correcting system according to the present invention includes: a risk model storage section that stores as a risk model, a correspondence relationship between threats constituting a risk and a measure against the threat; an information collecting section that collects as an adopted measure, a measure adopted in an analysis target system; a risk analyzing section that calculates a magnitude of the risk in the analysis target system as a risk value on the basis of the risk model and the adopted measure; an influence degree calculating section that calculates an influence degree of the existence or non-existence of the measure on a result of the calculation of the risk value; and a reason presenting section that notifies the influence degree to a user in relation to the measure as a reason why said risk value is calculated.

A risk model correcting method according to the present invention includes: stating a correspondence relationship between threats constituting a risk and a measure against said threat as a risk model; collecting a measure adopted in an analysis target system as an adopted measure; calculating a magnitude of the risk in the analysis target system on the basis of the risk model and the adopted measure as a risk value; calculating an influence degree of the threat or the measure on the risk value; and notifying the influence degree to a user in relation to the threat or the measure as a reason why the risk value is calculated.

A risk model correcting program according to the present invention is a program for instructing a computer to perform the steps of: storing as a risk model a correspondence relationship between threats constituting a risk and a measure against the threat; collecting a measure adopted in an analysis target system as an adopted measure; calculating a magnitude of the risk in the analysis target system as a risk value on the basis of the risk model and the adopted measure; calculating an influence degree of the threat or the measure on the risk value; and notifying the influence degree to a user in relation to the threat or the measure as a reason why the risk value is calculated.

One of effects of the present invention is in that a risk analyst can determine whether or not a calculation of a risk value is correct. The reason is in that in a risk model used to calculate the risk value, an influence degree representing how much the existence or non-existence of a measure influences the risk value is calculated, and a relationship between the influence degree and the measure is presented as a reason why the risk value is calculated.

BRIEF DESCRIPTION OF DRAWINGS

FIG. 10 is a diagram illustrating a specific example of a risk model;

FIG. 11 is a diagram illustrating a specific example of data collected from a risk analysis target system;

FIG. 12 is a diagram illustrating a calculation equation for calculating a risk value;

FIG. 13 is a diagram illustrating a calculation result of a magnitude of an influence degree of each measure;

FIG. 14 is a diagram illustrating a reason of risk value calculation;

FIG. 15 is a diagram illustrating a display example of correction candidates extracted according to Rules 1 and 2;

FIG. 16 is a diagram illustrating a display example of correction candidates extracted according to Rules 3 and 4;

FIG. 18 is a diagram illustrating a specific example of information collected from a risk analysis target system;

FIG. 19 is a diagram illustrating a calculation equation for calculating a risk value by use of the extended risk model;

FIG. 21 is a diagram illustrating a result of extraction of model correction candidates.

BEST MODE FOR CARRYING OUT THE INVENTION

Hereinafter, a risk model correcting system of the present invention will be described in detail with reference to the drawings.

First Exemplary Embodiment

Figure 1:
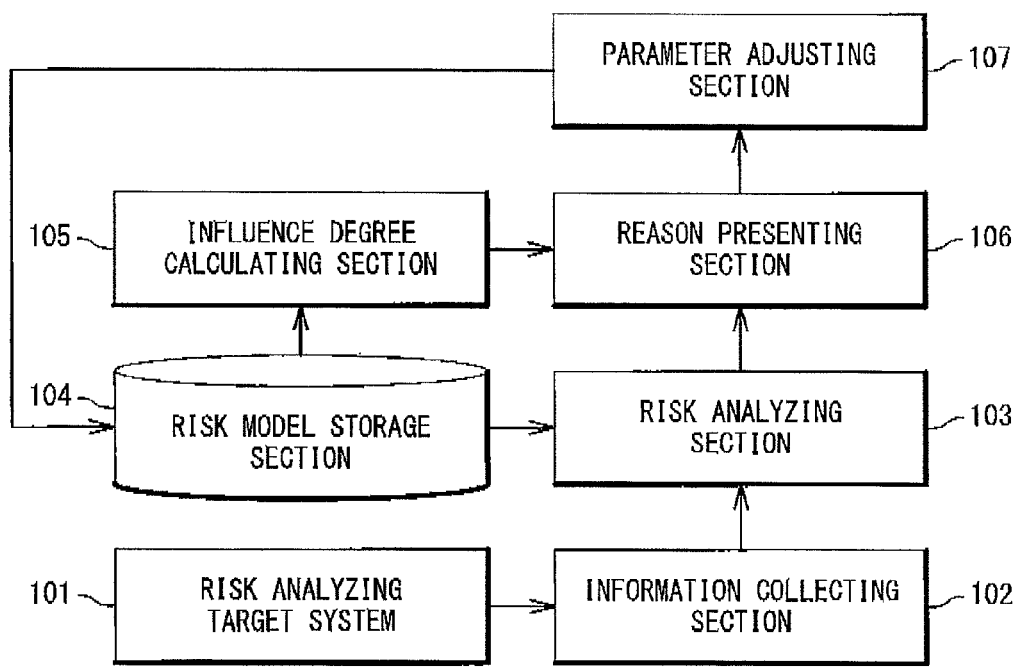
FIG. 1 is a block diagram illustrating a configuration of a risk model correcting system according to a first exemplary embodiment of the present invention.

FIG. 1 is a block diagram illustrating a configuration of the risk model correcting system according to a first exemplary embodiment of the present invention. As illustrated in FIG. 1, the risk model correcting system in the first exemplary embodiment of the present invention includes a risk analysis target system 101, an information collecting section 102, a risk analyzing section 103, a risk model storage section 104, an influence degree calculating section 105, a reason presenting section 106, and a parameter adjusting section 107.

These sections respectively operate as follows. That is, the risk analysis target system 101 is a system for which a risk is to be evaluated. The risk analysis target system 101 includes at least one of: a computer including a server or a client; an output apparatus such as a printer or a facsimile apparatus; a network apparatus that connects between the computer and the output apparatus; a physical security such as a security apparatus, a security gate, or a security wire installed on a network; and an operating system.

The information collecting section 102 collects data (hereinafter, to be referred to as adoption measure data) indicating existence or non-existence of a security measure implemented and practised in the risk analysis target system 101.

The risk analyzing section 103 calculates a risk value of the risk analysis target system 101 from a risk model stored in the risk model storage section 104 and the adoption measure data collected by the information collecting section 102, and thereby performs a risk analysis. The risk analyzing section 103 may collect information indicating presence or absence of an asset through the risk analysis target system 101, and use a magnitude of the asset stored in the risk model to calculate the risk value.

The risk model storage section 104 stores the risk model that relates threats constituting a risk inherent in an information system as the risk analysis target system to measures for decreasing the threats. In the risk model, a parameter such as a weight is related to each of the threats. The weight of the threat is calculated from a kind and a generation frequency of the threat, which are obtained by analyzing threats in a general information system. In the risk model, the threats or measures may be further related to each other. Further, as a weight of each of the measures, effectiveness for a corresponding threat and cost for implementing the measure may be added as an effect of the measure.

The influence degree calculating section 105 calculates a degree of influence of existence or non-existence of a measure on a calculation result of a risk value in each of the measures or the threat for the measure stored in the risk model, or a combination of them. The influence degree can be calculated from the parameter such as a weight of a threat and effect of a measure included in the risk model. For example, the influence degree can be a product of weights of a threat and measure (Influence degree=Weight of Threat×Weight of Measure). Also, a variation in a risk value depending on the existence or non-existence of a measure can be employed as an index. For example, if a risk value is decreased by 0.1 on an assumption of the "existence" of some measure, the influence degree of the measure on a risk can be 0.1.

The reason presenting section 106 displays a measure having a large influence degree calculated by the influence degree calculating section 105 as a reason why a risk value is calculated (risk calculation reason). At this time, another measure or a threat related to the other measure may be displayed together.

The parameter adjusting section 107 corrects the risk model if a risk analyst cannot accept the risk value or the risk calculation reason. The parameter adjusting section 107 corrects the risk model by, for example, changing a parameter (weight of a threat or effect of a measure) related to the threat or the measure in the risk model.

Figure 2:
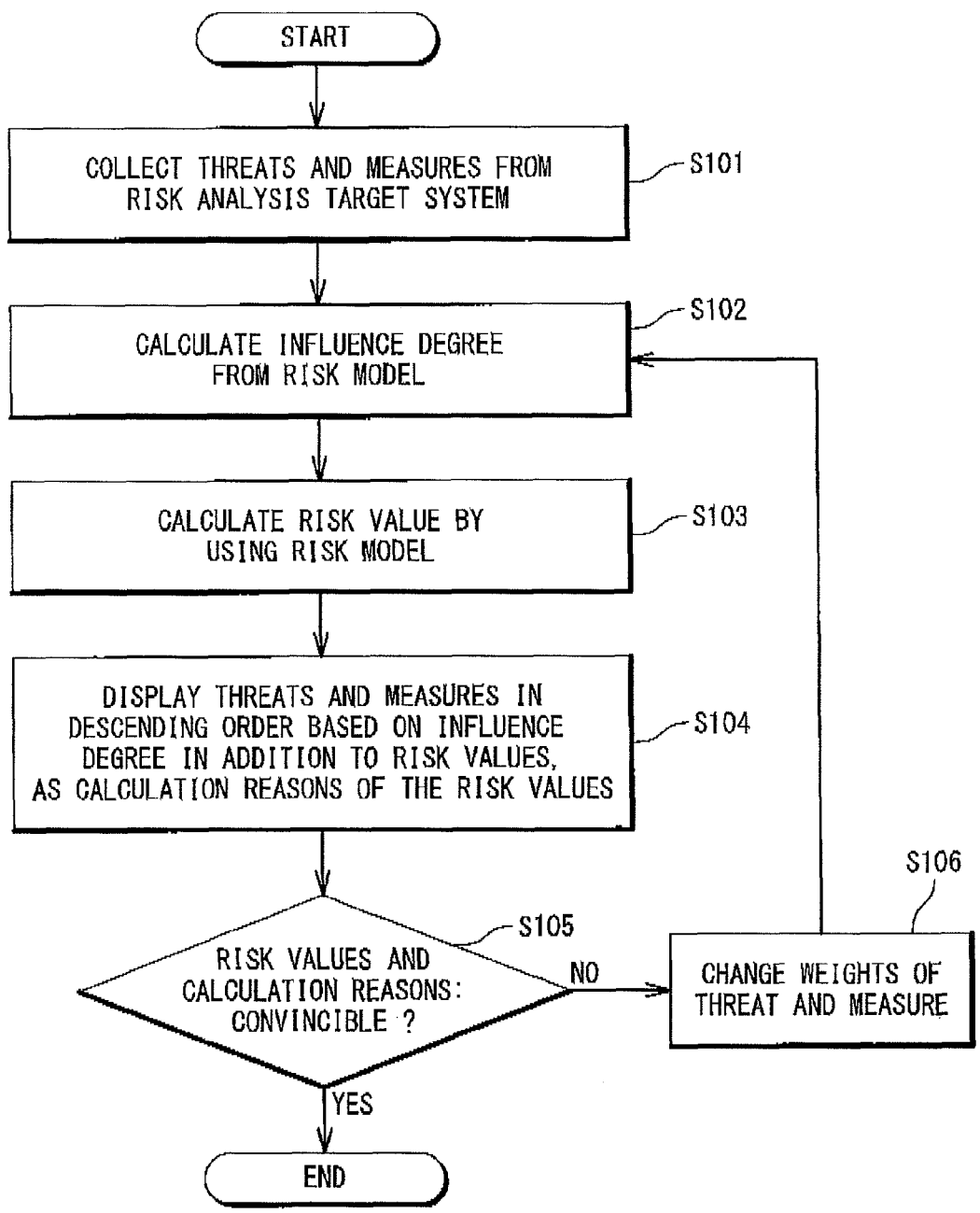
FIG. 2 is a flowchart illustrating an operation of the risk model correcting system in the first exemplary embodiment.

Next, referring to the block diagram of FIG. 1 and a flowchart of FIG. 2, an entire operation of the present exemplary embodiment will be described in detail. First, the information collecting section 102 collects adoption measure data from the risk analysis target system 101 (Step S101). Then, the influence degree calculating section 105 extracts a risk model from the risk model storage section 104 to calculate an influence degree of each of the threats and the measures (Step S102). A process of calculating the influence degree of each of the threats and the measures may be performed before Step S101 to store them in the risk model storage section 104 along with the risk model, and in Step S102, they may be only extracted.

Subsequently, the risk analyzing section 103 uses the adoption measure data and the risk model to calculate a risk value (Step S103). The reason presenting section 106 displays the risk value calculated by the risk analyzing section 103. Also, threats and measures are listed along with corresponding influence degrees (Step S104). At this time, the influence degrees, the threats, and the measures may be simply listed, or alternatively the measures may be listed in a descending order based on the influence degree, or other order. In particular, preferably, the measures are listed in the descending order based on the influence degree.

Also, all of the measures and the threats are not required to be listed but may be limited and listed within a certain range such as the top ten. Further, a risk analyst determines whether or not to accept the risk value and corresponding reason (Step S105). If the risk analyst cannot accept the risk value and the corresponding reason, parameters such as weights of the threats, and the effects of the measures, which are stored in the risk model storage section 104, are adjusted by the parameter adjusting section 107 (Step S106). If the parameters are adjusted, the control flow returns to the Step S102, where the calculation of the influence degree from the risk model, and the risk calculation using the risk model are carried out again.

Next, an effect of the present exemplary embodiment will be described. In the present exemplary embodiment, the risk model correcting system presents a relationship between an influence degree and existence or non-existence of a measure along with a risk value, as a reason why the risk value is calculated. A risk analyst can know which measure has a large influence degree, and determine whether or not a risk model has been configured as intended. If the risk analyst recognizes that the risk model should be changed, the risk model is changed. Thus, parameters such as weights of threats, and effects of measures can be changed.

Also, when the risk model correcting system is configured to list the threats and the measures in the descending order based on the influence degree, the risk analyst can know which of the parameters such as the weights of the threats or the effects of the measures should be changed.

Also, in the present exemplary embodiment, the risk model correcting system further evaluates the influence degree, and displays a value of the influence degree along with a risk value, as a reason why the risk value is calculated. As a result, there is presented the enough reason to determine whether or not the calculated risk value has been calculated in a proper manner, and the parameters linked to the threats, vulnerabilities, and measures included in the risk model should be changed to correct the risk value.

Second Exemplary Embodiment

Figure 3:
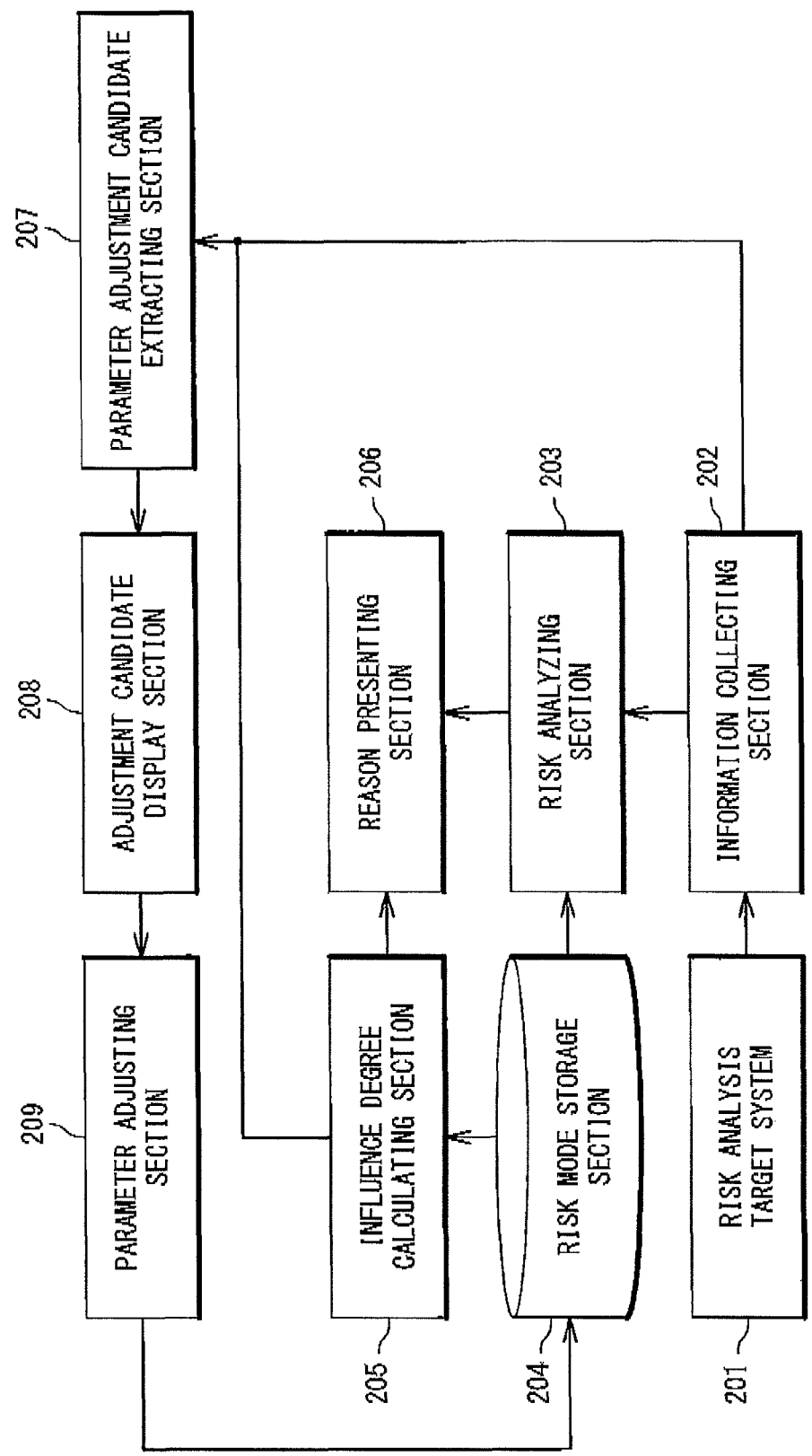
FIG. 3 is a block diagram illustrating a configuration of the risk model correcting system according to a second exemplary embodiment of the present invention.

Next, referring to the drawings, a second exemplary embodiment of the present invention will be described in detail. FIG. 3 is a block diagram illustrating a risk model correcting system in the second exemplary embodiment of the present invention. As illustrated in FIG. 3, the risk model correcting system of the present exemplary embodiment includes a risk analysis target system 201, an information collecting section 202, a risk analyzing section 203, a risk model storage section 204, an influence degree calculating section 205, a reason presenting section 206, a parameter adjustment candidate extracting section 207, an adjustment candidate displaying section 208, and a parameter adjusting section 209.

These sections respectively operate as follows. That is, the risk analysis target system 201 operates in the same manner as the risk analysis target system 101 in the first exemplary embodiment. The information collecting section 202 operates in the same manner as the information collecting section 102 in the first exemplary embodiment. The risk analyzing section 203 operates in the same manner as the risk analyzing section 103 in the first exemplary embodiment. The risk model storage section 204 operates in the same manner as the risk model storage section 104 in the first exemplary embodiment. The influence degree calculating section 205 operates in the same manner as the influence degree calculating section 105 in the first exemplary embodiment. The reason presenting section 206 operates in the same manner as the reason presenting section 106 in the first exemplary embodiment.

The parameter adjustment candidate extracting section 207 extracts a point where there may be a gap between an idea of a risk analyst and a risk model as a risk model adjustment candidate from an influence degree of each of the threats and the measures and adoption measure data. For example, regarding a measure that is not practised but has a high influence degree, the influence degree may be estimated higher than that in the idea of the risk analyst. That is, an effect of the measure or a magnitude of a threat related to the measure may be estimated higher. For this reason, such a measure or the threat related the measure can be a parameter adjustment candidate. Similarly, regarding a measure that is practised but has a low influence degree, a magnitude of the threat or an effect of the measure may be estimated lower. For this reason, such a measure or the threat related to the measure is extracted as the parameter adjustment candidate.

The adjustment candidate displaying section 208 displays measures or threats extracted as the parameter adjustment candidate, along with a calculated risk value and a risk calculation reason. Based on this, the risk analyst is asked whether or not a parameter should be corrected. The risk analyst can determine whether or not to correct the parameter on the basis of the display.

The parameter adjusting section 209 corrects the parameter (effect of the measure or weight of the threat) related to the measures or the threats according to an instruction from the risk analyst.

Figure 4:
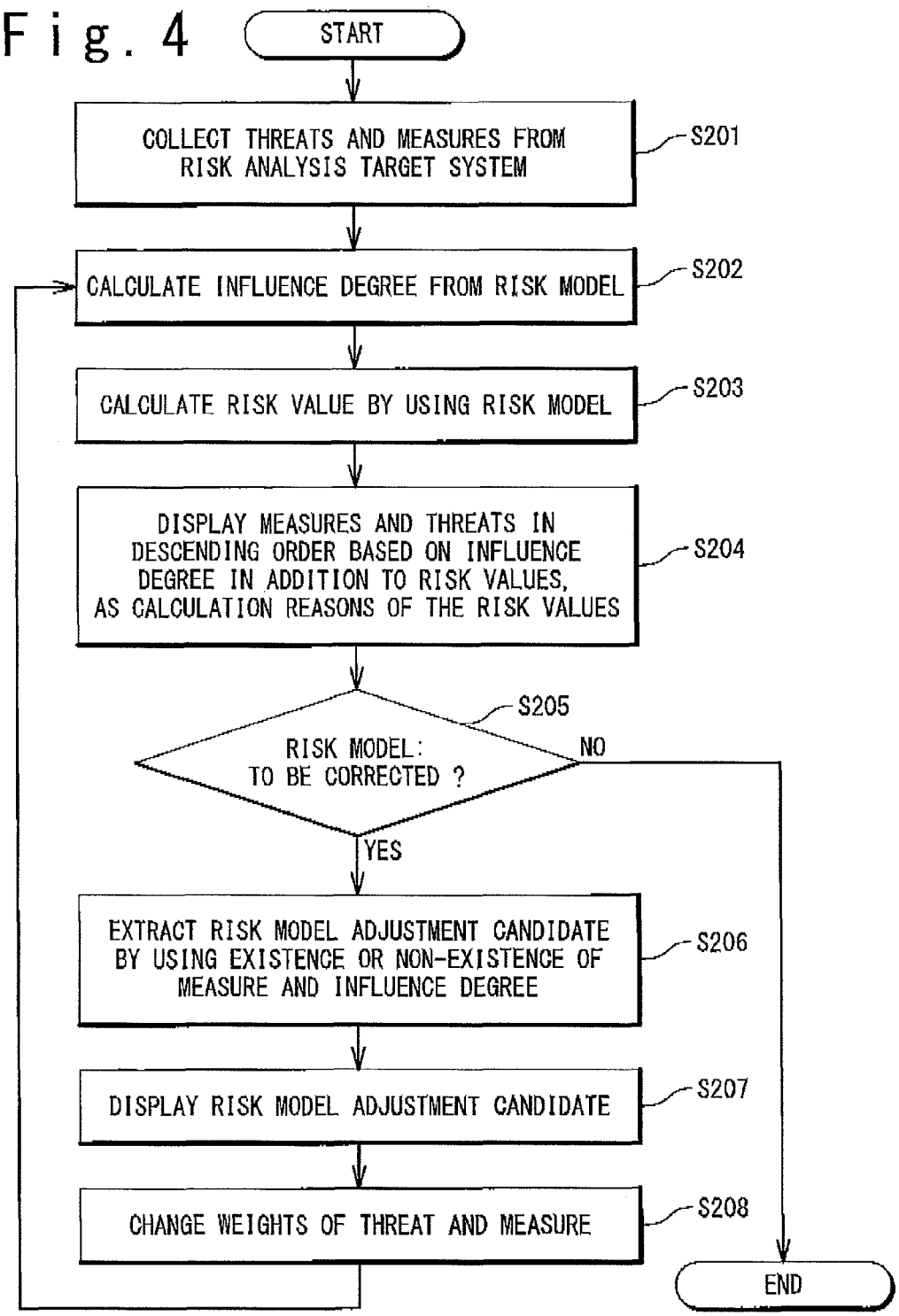
FIG. 4 is a flowchart illustrating an operation of the risk model correcting system in the second exemplary embodiment.

Next, referring to the block diagram of FIG. 3, and a flowchart of FIG. 4, an entire operation of the present exemplary embodiment will be described in detail.

First, the information collecting section 202 collects data (adoption measure data) indicating whether or not the measure is practiced, from the risk analysis target system 201 (Step S201). Then, the influence degree calculating section 205 extracts a risk model from the risk model storage section 204 to calculate an influence degree of each of the threats and measures (Step S202). The process of calculating the influence degrees of each of the threats and measures for the threats may be performed before Step S201 to store them in the risk model storage section 204 along with the risk model, and at Step S202, the influence degrees may be only extracted.

Subsequently, the risk analyzing section 203 uses the adoption measure data collected by the information collecting section 202 and the risk model to calculate a risk value (Step S203). The reason presenting section 206 displays the risk value calculated by the risk analyzing section 203, and also lists the influence degrees in relation to the threats and measures (Step S204). At this time, the influence degrees, the threats, and the measures may be simply listed, or alternatively may be listed in the descending order based on the influence degree. In particular, preferably, they are listed in a descending order based on the influence degree.

Also, all of the measures and threats are not required to be listed, but may be limited and listed within a certain range such as within the top ten. Further, a risk analyst determines whether or not to accept the risk value and a corresponding reason (Step S205).

If the risk analyst cannot accept the risk value and corresponding reason, a parameter adjustment candidate is extracted by use of the influence degree and the existence or non-existence of a measure by the parameter adjustment candidate section 207 (Step S206). Then, the adjustment candidate displaying section 208 displays a measure or a threat, which is the parameter adjustment candidate and a parameter (effect of the measure or weight of the threat) related to the parameter adjustment candidate (Step S207). If the risk analyst cannot accept the risk value and the corresponding reason, the parameter adjusting section 209 adjusts the parameter related to the threat or the measure stored in the risk model storage section 204 (Step S208). If the parameter is adjusted, the control flow returns to Step S202, where the calculation of the influence degree from the risk model, and the risk calculation using the risk model are carried out again.

Next, an effect of the present exemplary embodiment will be described. In the present exemplary embodiment, the risk model correcting system presents the influence degrees and existence or non-existence of a measure as a reason why a risk value is calculated, along with the risk value. Further, a parameter adjustment candidate is displayed from existence or non-existence of practising of the measure and the influence degree. If a risk analyst recognizes that a risk model should be changed, the risk model is changed. Thus, a parameter such as a weight linked to a threat, a vulnerability, and a measure included in the risk model can be changed.

Also, in the present exemplary embodiment, the risk model correcting system presents the parameter adjustment candidate from the existence or non-existence of practising of the measure and the influence degree. Based on this, a point where a parameter should be changed in the risk model can be presented.

Further, in the present exemplary embodiment, the influence degree is evaluated, and a value of it is displayed as a reason why a risk value is calculated, along with the risk value. Also, the parameter adjustment candidate is further displayed by the risk model correcting system. Based on this, there is presented enough reason to determine whether or not the calculated risk value is calculated in a proper manner. Also, in order to correct the risk value, there is presented the enough reason to determine whether or not a parameter in the risk model should be changed.

Third Exemplary Embodiment

Figure 5:
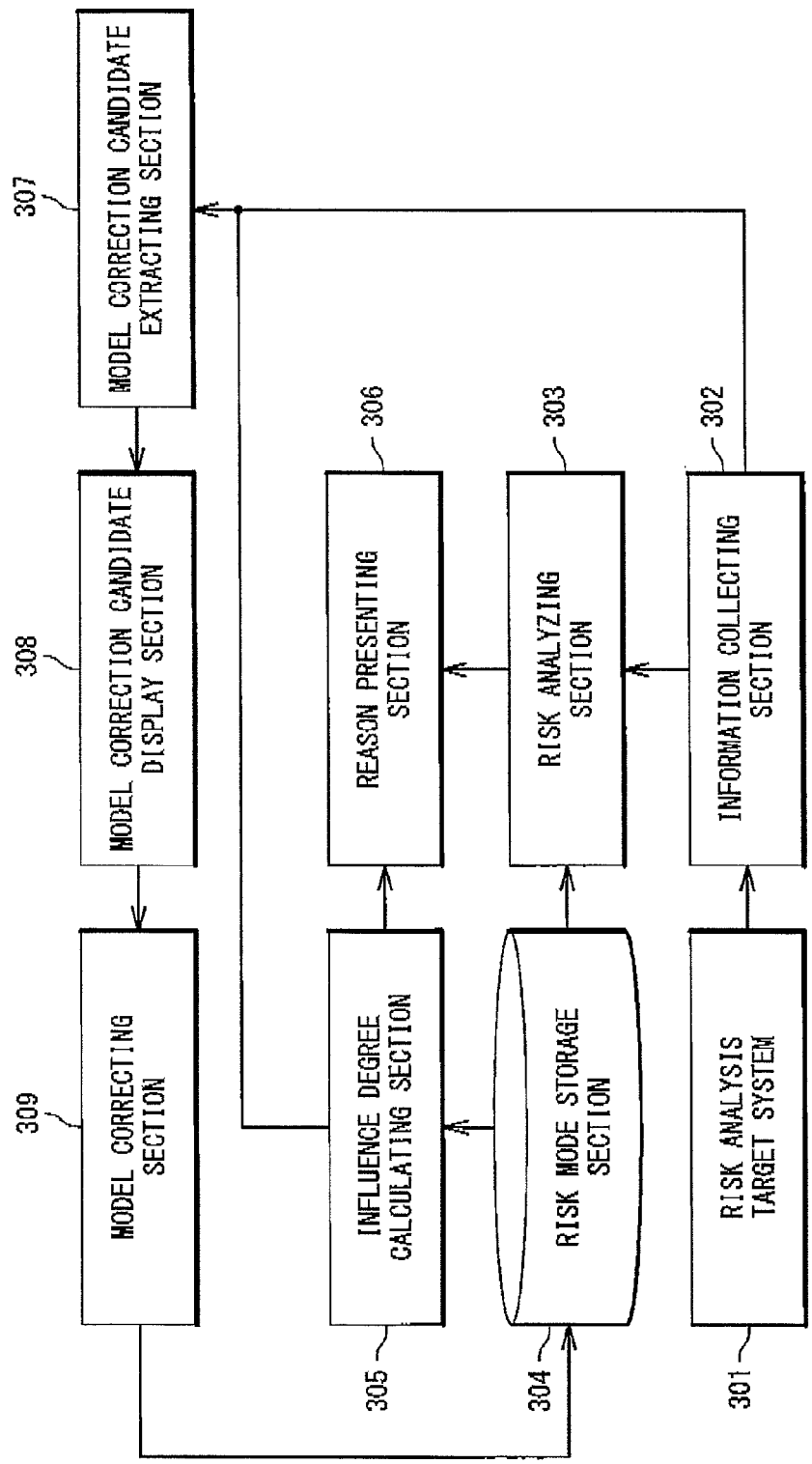
FIG. 5 is a block diagram illustrating a configuration of the risk model correcting system according to a third exemplary embodiment of the present invention.

Next, a third exemplary embodiment of the present invention will be described in detail with reference to the drawings. FIG. 5 is a block diagram illustrating a risk model correcting system of the present exemplary embodiment. As illustrated in FIG. 5, in the risk model correcting system of the present exemplary embodiment, a model correction candidate extracting section 307 is provided in place of the parameter adjustment candidate extracting section 207 in the second exemplary embodiment. Also, in place of the adjustment candidate displaying section 208 in the second exemplary embodiment, a model correction candidate displaying section 308 is provided. Further, in place of the parameter adjusting section 209 in the second exemplary embodiment, a model correcting section 309 is provided.

These sections respectively operate as follows. That is, a risk analysis target system 301 operates in the same manner as the risk analysis target system 201 in the second exemplary embodiment. An information collecting section 302 operates in the same manner as the information collecting section 202 in the second exemplary embodiment. A risk analyzing section 303 operates in the same manner as the risk analyzing section 203 in the second exemplary embodiment. A risk model storage section 304 operates in the same manner as the risk model storage section 204 in the second exemplary embodiment. An influence degree calculating section 305 operates in the same manner as the influence degree calculating section 205 in the second exemplary embodiment. A reason presenting section 306 operates in the same manner as the reason presenting section 206 in the second exemplary embodiment.

The model correction candidate extracting section 307 extracts a correction candidate for correcting a risk model on the basis of an influence degree calculated by the influence degree calculating section 305 and data collected by the information collecting section 302 and indicating existence or non-existence of a measure. A method of extracting the correction candidate by the model correction candidate extracting section 307 may be the same as the extracting method by the parameter adjustment candidate extracting section 207 in the second exemplary embodiment.

In order to extract a correction candidate, the model correction candidate extracting section 307 may further present risk models close to the correction candidate, in addition to the correction candidate extracted in the same manner as the parameter adjustment candidate extracting section 207. This is because data on the risk models close to the correction candidate may be required in order to add a threat or a measure. For example, if some of the threats and measures are correction candidates, another measure related to the same threat may be included in correction candidates. By doing so, another measure linked to the same threat and the measure to be corrected can be compared with each other. Accordingly, a consistent threat analysis can be performed, e.g., a new measure is not added, but already existing measures are separated, or another measure that has a same purpose as that of an already existing measure but uses different means is added.

The model correction candidate displaying section 308 displays the model correction candidates extracted by the model correction candidate extracting section 307, and thereby asks whether or not the risk model is corrected, to a risk analyst.

The model correcting section 309 adds a threat or a measure to the model correction candidate displayed by the model correction candidate displaying section 308. Also, if the risk analyst determines that it is only necessary to correct a parameter displayed as the model correction candidate, the parameter may be corrected, or alternatively the risk model and the parameter may be simultaneously corrected.

Figure 6:
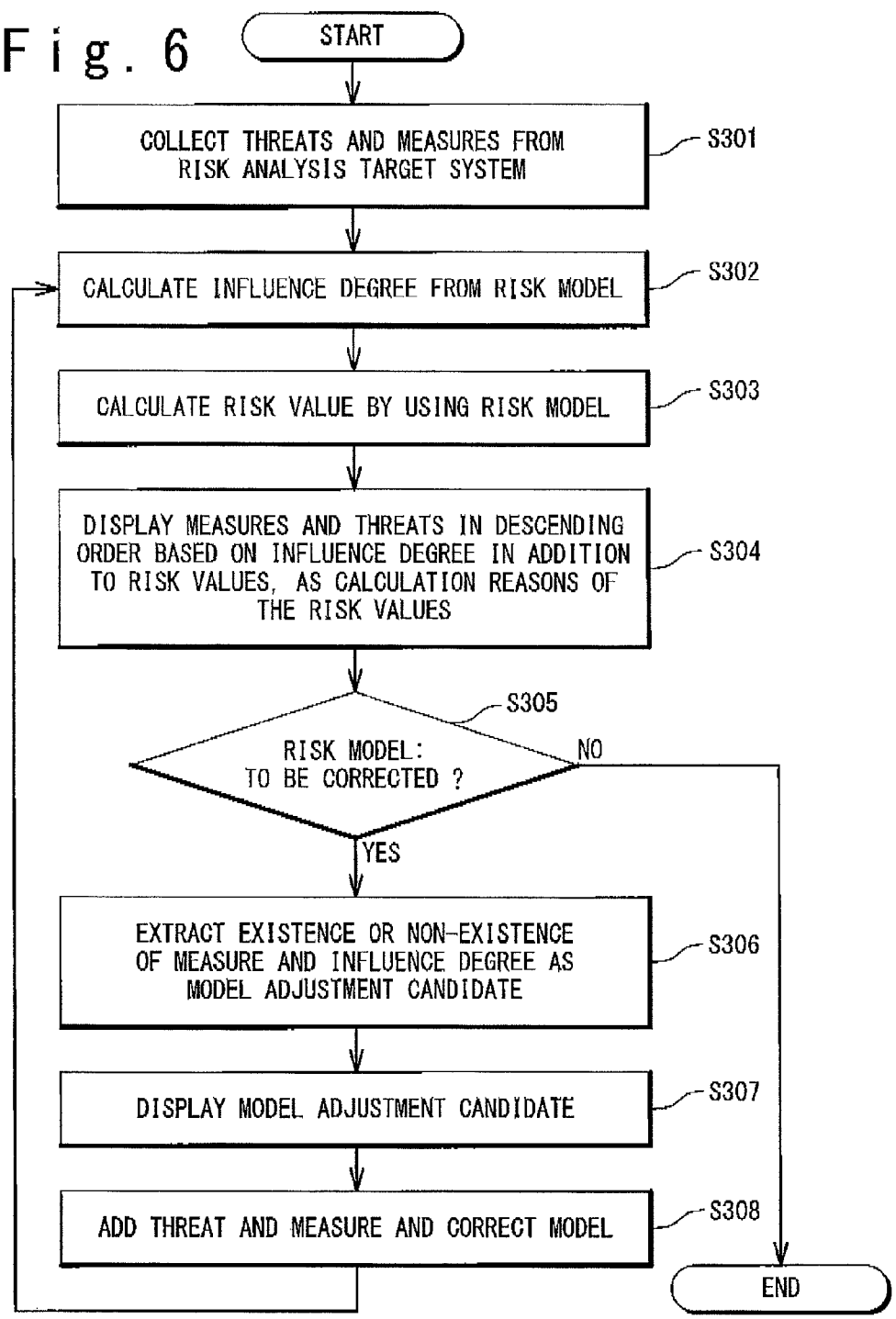
FIG. 6 is a flowchart illustrating an operation of the risk model correcting system in the third exemplary embodiment.

Next, referring to the block diagram of FIG. 5, and a flowchart of FIG. 6, an entire operation of the present exemplary embodiment will be described in detail.

Similarly to the process of Steps S101 to S104 in the first exemplary embodiment, or in Steps S201 to S204 in the second exemplary embodiment, the information collecting section 202 collects data indicating the existence or non-existence of practising of a measure from the risk analysis target system 301, and the reason presenting section 306 displays a reason why a risk value is calculated, along with an influence degree calculated from a risk model, and thereby asks whether or not the risk model should be corrected (Steps S301 to S304). If a risk analyst determines that the risk model should be corrected, the model correction candidate extracting section 307 extracts a model correction candidate from risk models on the basis of the existence or non-existence of a measure and influence degree (Steps S305 and S306). The model correction candidate displaying section 308 displays the model correction candidate extracted by the model correction candidate extracting section 307 (Step S307).

Then, the risk analyst uses the model correcting section 309 to correct the risk model, and stores the corrected model in the risk model storage section 304 (Step S308). If the risk model is corrected, the control flow returns to Step S302, where the calculation of the influence degree from the risk model and the risk calculation using the risk model are carried out again.

Next, an effect of the present exemplary embodiment will be described. In the present exemplary embodiment, the risk model correcting system presents a reason why a risk value is calculated from an influence degree representing influence on the risk calculation and the existence or non-existence of a measure, and further displays a correction candidate for a risk model. Based on this, a risk analyst can determine whether or not the risk model should be corrected.

Further, in the present exemplary embodiment, the risk model correcting system is configured to display the model correction candidate in which it may be better to correct the risk model from the influence degree representing the influence on the risk calculation and the existence or non-existence of the measure, and correct it, and can therefore correct the risk model.

Fourth Exemplary Embodiment

Figure 7:
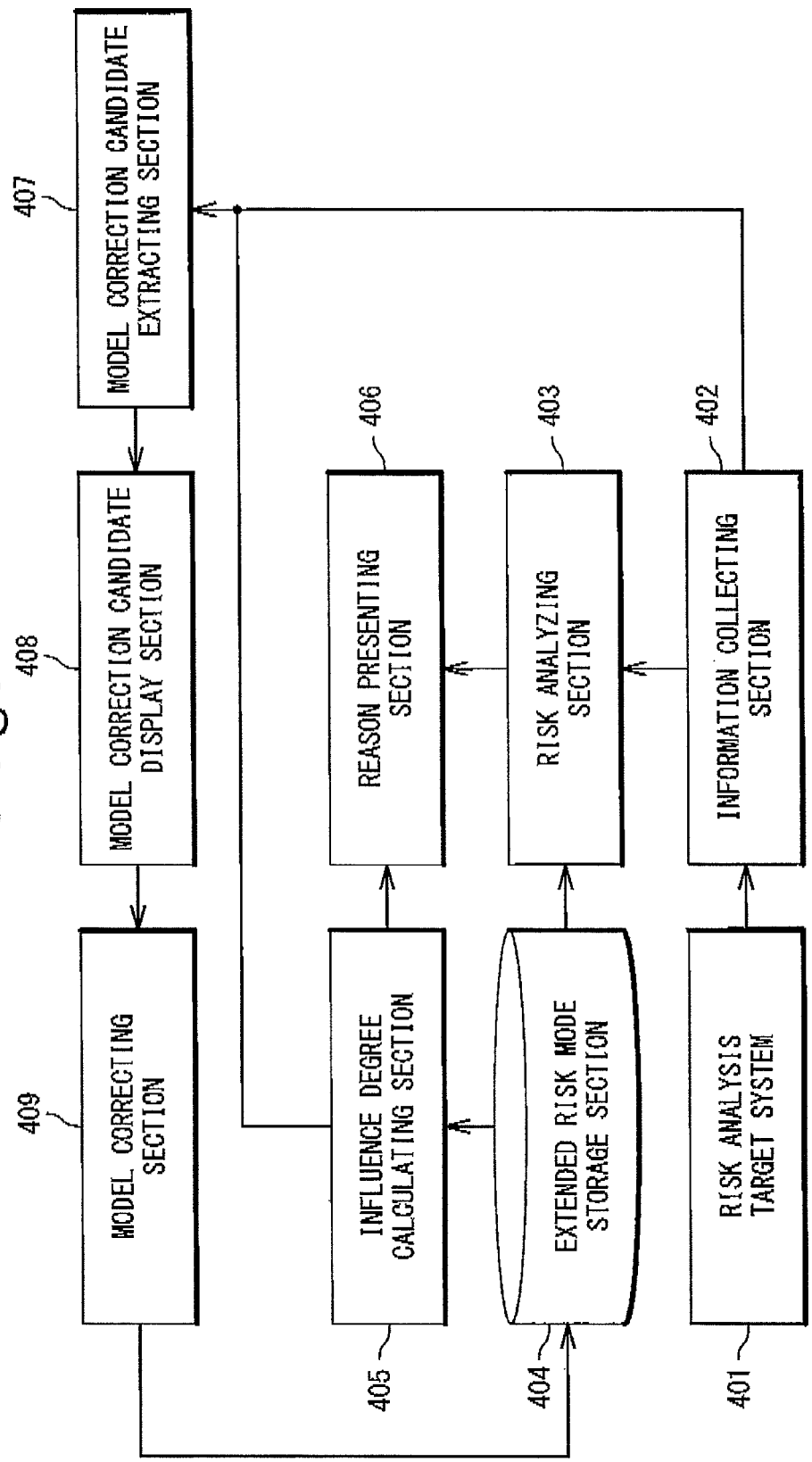
FIG. 7 is a block diagram illustrating a configuration of the risk model correcting system according to a fourth exemplary embodiment of the present invention.

Next, a fourth exemplary embodiment of the present invention will be described in detail referring to the drawings. FIG. 7 is a block diagram illustrating a risk model correcting system of the present exemplary embodiment. As illustrated in FIG. 7, in the risk model correcting system of the present exemplary embodiment, an extended risk model storage section 404 is provided in place of the risk model storage section 304 in the third exemplary embodiment.

The sections respectively operate as follows. That is, an information collecting section 402 collects data (adoption measure data) indicating the existence or non-existence of the measure or existence or non-existence of an asset from a risk analysis target system 401. A risk analyzing section 403 applies the data collected by the information collecting section 402 to an extended risk model stored in the extended risk model storage section 404 to calculate a risk value.

Figure 9:
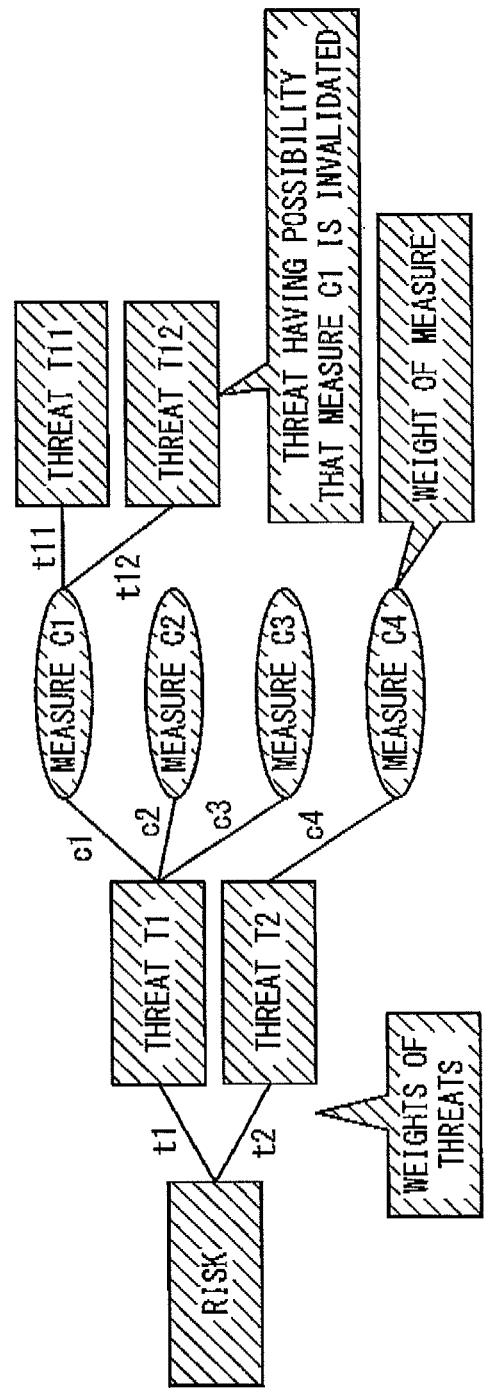
FIG. 9 is a diagram illustrating an extended risk model.

The extended risk model storage section 404 stores the extended risk model that is a sort of a risk model. The extended risk model refers to a model in which, similarly to a risk model, threats constituting a risk and measures for the threats are related to each other to calculate the risk. The extended risk model storage section 404 further stores a threat that may invalidate the measure, in relation to the measure. As described, by relating to the threat that may invalidate the measure, a more detailed threat analysis can be performed. The extended risk model is illustrated in FIG. 9.

An influence degree calculating section 405 calculates an influence degree of each of the threat or the existence or non-existence of the measure in the extended risk model on the risk value calculation. In the influence degree calculating section 405, similarly to the cases of the first to third exemplary embodiments, the influence degree may be calculated from a parameter such as a threat or a measure added to the risk model; however, it may be calculated as follows: it is assumed that there is a threat T1 associated with a risk as illustrated in FIG. 9, against which there is a measure C1, and further there is a threat T11 that may invalidate C1, against which there is a measure c11. An influence degree for this case is assumed to be (t1×c1). It may be assumed to be (t1×c1×t11×c11). t1 and t11 represent magnitudes (weights) of the threats, and c1 and c11 represent magnitude of effects of the measures.

A reason presenting section 406 displays a reason why the risk value is calculated, along with the risk value calculated by the risk analyzing section 403. As the reason of the calculation, for example, the existence or non-existence of measures are listed in a descending order based on the influence degree calculated by the influence degree calculating section 405.

If it is considered that there is a deficiency in the extended risk model due to an insufficient prior threat analysis, a model correction candidate extracting section 407 extracts a point to which a detailed threat analysis should be added, from the extended risk model. The point to which a detailed threat analysis should be added is a same point as a focus point of the parameter correction in the first or second exemplary embodiment. In particular, regarding a measure when a threat is not present, it is highly likely that a risk value was determined to be wrong due to the insufficient threat analysis, and therefore the measure can be a major model correction candidate for which a further threat analysis should be performed.

A model correction candidate displaying section 408 displays a model correction candidate extracted by the model correction candidate extracting section 407.

A model correcting section 409 corrects ones required to be corrected among the model correction candidates displayed on the model correction candidate display section 408, and updates the extended risk model stored in the extended risk model storage section 404.

Figure 8:
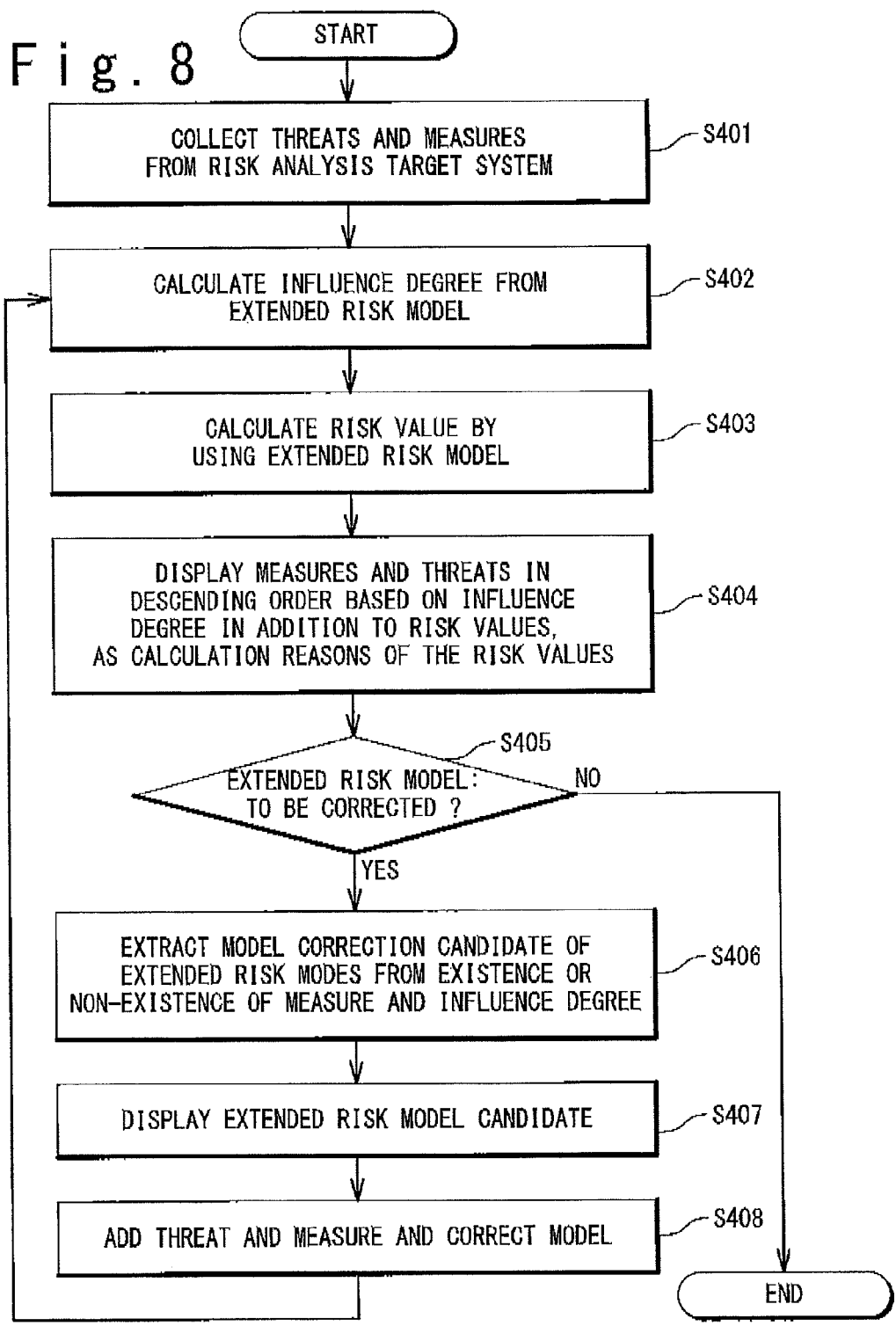
FIG. 8 is a flowchart illustrating an operation of the risk model correcting system in the fourth exemplary embodiment.

Next, referring to the block diagram of FIG. 7 and a flowchart of FIG. 8, the entire operation of the present exemplary embodiment will be described in detail.

Similarly to the cases of the first to third exemplary embodiments, the information collecting section 402 collects data (adoption measure data) indicating the existence or non-existence of practising of a measure from the risk analysis target system 401 (Step S401). Then, the influence degree calculating section 405 uses the extended risk model to calculate an influence degree (Step S402). The influence degree is calculated, for example, as follows. That is, when it is assumed that an effect of the measure is denoted by c, and the magnitude of a threat related to the measure is denoted by t, an effect on the threat linked with the measure can be calculated by $[c \times (1-t)]$. If a plurality of threats are linked to one measure, the effect can be calculated by, for example, a sum operation. Subsequently, the risk analyzing section 403 extracts the extended risk model from the extended risk model storage section 404, and uses the adoption measure data to calculate a risk value (Step S403).

Then, the reason presenting section 406 displays a reason why the risk value is calculated, along with the influence degree value. Based on this, whether or not the extended risk model should be corrected is asked (Step S404). When a risk analyst determines that the extended risk model should be corrected, a model correction candidate in the extended risk model is extracted on the basis of the existence or non-existence of a measure and the influence degree by the model correction candidate extracting section 407 (Step S406). The model correction candidate display section 408 displays the extracted model correction candidate (Step S407).

Subsequently, the risk analyst uses the model correcting section 409 to correct the extended risk model, and stores the corrected model in the extended risk model storage section 404 (Step S408). If the extended risk model is corrected, the control flow returns to Step S402, where the calculation of the influence degree from the extended risk model and the risk value calculation using the extended risk model are carried out again.

Next, an effect of the present exemplary embodiment will be described. In the present exemplary embodiment, the risk model correcting system uses the extended risk model to calculate a risk value including a further threat against a measure. On the basis of an influence degree representing influence on the risk value calculation and the existence or non-existence of the measure, a point where a threat analysis is considered to be insufficient in the extended risk model is pointed out. Based on this, the extended risk model is corrected. The extended risk model is corrected to be able to perform a detailed risk analysis suitable for a risk analysis target without producing an individual risk model in advance.

It should be noted that in the present exemplary embodiment, the risk model correcting system provided with the extended risk model storage section 404 in place of the risk model storage section 304 in the third exemplary embodiment will be described; however, the extended risk model storage section 404 may be provided in place of the risk model storage section 104 or 204 in the first or second exemplary embodiment.

Also, among the respective sections in the above-described respective exemplary embodiments, the sections other than the risk model storage section 104, 204, and 304, and extended risk model storage section 404 that are respectively achieved by storage sections (memories), and sections (sections respectively achieved by displays) of the adjustment candidate displaying section 208, model correction candidate displaying section 308 and 408, and reason presenting section 106, 206, 306, and 406 can be achieved by a software in an information processing apparatus such as a personal computer or a server apparatus. That is, they can be achieved by a CPU and a program in the information processing apparatus.

Example 1

Next, a specific example (Example 1) of the risk model correcting system in the second exemplary embodiment will be described.

FIG. 10 illustrates a specific example of a risk model. As illustrated in FIG. 10, a risk model is a model in which relationships between threats corresponding to a risk and measures against the threats are described along with parameters such as weights of the threats and effects of the measures. The risk model is stored in the risk model storage section 204 (see FIG. 3). The weight of the threat is a value calculated from generation frequency of the threat, a degree of damage, a success probability of attack, and the like, which may be separately given, or a value including them may be given as the weight. In this example, the weight is defined as a value added with the both. Also, an effect of a measure is a rate representing how much a threat corresponding to each measure can be removed.

The information collecting section 202 (see FIG. 3) collects data (adoption measure data) indicating the existence or non-existence of the measure on each computer that is an example of the risk analysis target system 201 (see FIG. 3). A specific example of the collected data is illustrated in FIG. 11. In the example of FIG. 11, the adoption measure data are collected from two computers PC1 and PC2. Also, on both of PC1 and PC2, C2 is implemented or practiced as a measure against a threat T1. Further, as a measure against a threat T3, C7 and C8 are implemented and practised. It should be noted that in this example, a relationship between the threats and the measures is illustrated as a risk model; however, a relationship between the threats and vulnerabilities may be given, and the measures against the vulnerabilities may be separately defined. In such a case, on the basis of the existence of the vulnerabilities, the measures may be considered as being not implemented or practised, and the measures in the present example may be implemented or practiced with being replaced by the vulnerabilities.

The risk analyzing section 203 (see FIG. 3) calculates a risk value from the risk model and data collected from PC1 and PC2. The risk value can be calculated according to, for example, a calculation expression illustrated in FIG. 12. In FIG. 12, threats related to a risk R are denoted by T1, T2, ..., Ti, variables representing implementation statuses of measures against the threats Ti by $xi1, xi2, ..., xim$, weights of the threats by $t1, t2, ..., ti$, and effects of the measures against the threats by $ci1, ci2, ..., cim$. If the risk value is calculated from the risk model illustrated in FIGS. 10 and 11 and data on the analysis target systems (PC1 and PC2) according to this equation, the risk value will be |R|=0.62554.

The influence degree calculating section 205 (see FIG. 3) calculates an influence degree. The influence degree can be calculated by [(magnitude (weight) of threat)×(effect of measure)]. A result of the calculation of an influence degree of each of the measures is illustrated in FIG. 13. It should be noted that in FIG. 13, to clearly illustrate whether the influence degrees are large or small, not only numerical values of the influence degrees, but levels and rankings of the influence degrees, and the practice statuses of the respective measures are illustrated together. The level of the influence degree of 0-1 is divided into three levels, and the influence degree level is expressed as Low, Middle, or High. The rankings of the influence degrees are ones for the case where the influence degrees are listed in the descending order.

Subsequently, the reason presenting section 206 (see FIG. 3) presents a risk calculation reason as exemplified in FIG. 14. The corresponding measures and threats are presented in the descending order based on the influence degree. The number of threats and measures to be presented may be arbitrary. In the example of FIG. 14, the five measures and threats are related to each other in the descending order based on the influence degree, and presented as the risk calculation reason. Also, in FIG. 14, the top five are displayed but top ten or top twenty may be presented as the risk calculation reason, depending on the magnitude of the risk model. Alternatively, in simply not the descending order based on the influence degree, but the presentation may be given based on the risk or threat. Also, the risk calculation reason may be presented with measures having been implemented and measures not having been implemented being classified. Further, regardless of the influence degrees, the threats against which no measure is practised may be presented as the risk calculation reason.

If the risk analyst checks the displayed risk value and the corresponding reason, and can accept a degree of the risk value and the corresponding reason; the risk model is not required to be corrected. In this case, the risk analysis is complete. On the other hand, if he/she cannot accept the risk value and the corresponding reason, a parameter adjustment candidate is extracted by the parameter adjustment candidate extracting section 207 (see FIG. 3). The parameter adjustment candidate is extracted according to some heuristic rules. For example, the parameter adjustment candidate is extracted according to a rule for a parameter adjustment candidate used in the second exemplary embodiment. In the present example, as a correction candidate for increasing the risk value, the parameter adjustment candidate is extracted according to the following rules:

Rule 1: A measure having a high influence degree among measures being implemented.

Rule 2: A measure that is not implemented and has a low influence degree.

Also, as a correction candidate for decreasing the risk value, the parameter adjustment candidate is extracted according to the following rules:

Rule 3: A measure that is implemented although an influence degree is low.

Rule 4: A measure that is not implemented although an influence degree is high.

As the measure having a high influence degree, for example, among groups that are classified on the basis of absolute values of influence degrees, a measure included in a group having high absolute values of influence degrees is selected. As the measure having a low influence degree, for example, among the groups that are classified on the basis of the absolute values of the influence degrees, a measure included in a group having low absolute values of influence degrees is selected. Also, for example, an influence degree added with "High" may be defined as a high influence degree, and an influence degree added with "Low" may be defined as a low influence degree. Further, not the absolute value but a relative value may be assigned. For example, the first to third influence degree rankings illustrated in FIG. 13 may be defined as the high influence degree, and the eights to tenth influence degree rankings may be defined as the low influence degree. Also, a measure may be extracted from the both viewpoints. In the present example, a measure is extracted from the both viewpoints. This is because the parameter adjustment candidate is extracted without omission.

The parameter adjustment candidate extracting section 207 extracts the parameter adjustment candidate according to Rule 1 on the basis of the influence degrees of the respective measures as exemplified in FIG. 13. As a result, the measure C2 against the threat T1 is extracted. If the parameter adjustment candidate is extracted according to Rule 2, the measures C5 and C8 against the threat T2 are extracted. If the parameter adjustment candidate is extracted according to Rule 3, the measures C7 and C8 respectively against the threats T3 and T4 are extracted. Further, if the parameter adjustment candidate is extracted according to Rule 4, the measures C1 and C6 respectively against the threats T1 and T3 are extracted. The extracted parameter adjustment candidates are presented by the adjustment candidate displaying section 208 (see FIG. 3) to the risk analyst who performs the risk analysis. For example, display examples of the correction candidates extracted according to Rules 1 and 2 and Rules 3 and 4 are respectively illustrates in FIGS. 15 and 16.

It should be noted that which parameter is increased or decreased can be uniquely determined depending on each of Rules. As illustrated in FIGS. 15 and 16, "increase" and "decrease" are presented together. The risk analyst uses the parameter adjusting section 209 (see FIG. 3) to adjust a parameter for a candidate for which the adjustment is determined to be required among the respective parameter adjustment candidates. That is, the parameter adjusting section 209 changes the parameter according to an instruction of the risk analyst. For example, when a parameter is adjusted for the measure C2 against the threat T1 extracted according to Rule 1, the risk value can be increased by decreasing the effect or increasing the threat. Also, for example, if a magnitude of the threat T1 is changed from 0.7 to 0.9, the risk value changes from 0.63 to 0.65. On the other hand, if the effect is changed from 0.7 to 0.3, the risk value changes from 0.63 to 0.76.

Also, in a case of the measures C5 and C8 against the threat T2 extracted according to Rule 2, if the risk value is to be increased, increasing a magnitude of the threat is only the way. Accordingly, if the magnitude of the threat is changed from 0.4 to 0.8, the risk value changes from 0.63 to 0.88.

Further, in the case of the measures C7 and C8 against the threat T3 extracted according to Rule 3, in order to decrease the risk value, it is only necessary to increase the effects of the measures. For example, if the effect of C7 against the threat T3 is changed from 0.5 to 0.9, the risk value changes from 0.63 to 0.55. On the other hand, if the effect of the measure C8 against the threat T3 is changed from 0.3 to 0.8, the risk value changes from 0.53 to 0.67.

Still further, in a case of the measures C1 and C6 against the threats T1 and T3 extracted according to Rule 4, in order to decrease the risk value, it is only necessary to decrease the magnitudes of the threats. For example, by changing the magnitude of the threat T1 from 0.7 to 0.3, the risk value is changed from 0.63 to 0.57. By changing the magnitude of the threat T3 from 0.6 to 0.2, the risk value is changed from 0.63 to 0.56. The parameter adjusting section 209 makes one or more changes recognized by the risk analyst as being necessary among these changes to change the risk model stored in the risk model storage section 204 (see FIG. 3).

Example 2

Next, Example 2 of the risk model correcting system in the fourth exemplary embodiment will be described.

Figure 17:
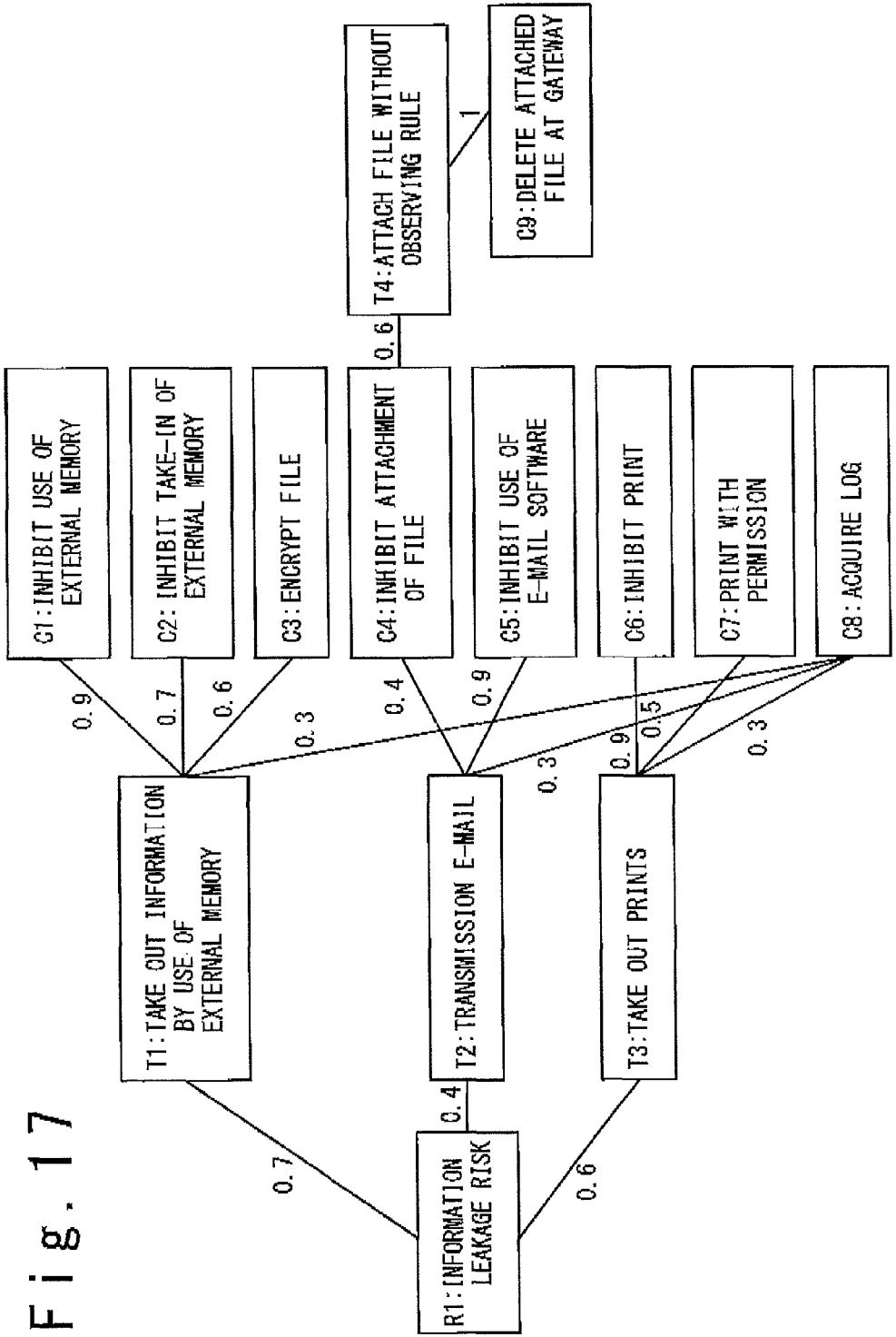
FIG. 17 is a diagram illustrating an example of the extended risk model.

FIG. 17 is a diagram illustrating an example of the extended risk model stored in the extended risk model storage section 404 (see FIG. 7). In the extended risk model exemplified in FIG. 17, as a threat that invalidates a measure C4 of "File attachment is inhibited", a threat T4 of "File is attached against rules" is added to the risk model in the first exemplary embodiment. The weight "0.6" of the threat T4 is one calculated from generation frequency of the threat T4 invalidating the measure C4. The case where this value is 1 represents that the measure (C4 in this case) linked to the threat does not represent an effect unless a measure against the threat is taken.

The information collecting section 402 (see FIG. 7) collects data (adoption measure data) indicating existence or non-existence of a measure on a PC (e.g., PC1) that is an example of the risk analysis target system 401 (see FIG. 7). A specific example of the collected data is illustrated in FIG. 18. The risk analyzing section 403 (see FIG. 7) uses the extended risk model exemplified in FIG. 17 and collected data exemplified in FIG. 18 to calculate a risk value. The risk value is calculated according to a calculation equation illustrated in FIG. 19. T1', T2', ..., Tm' in FIG. 19 represent threats that may invalidate a measure Cij. Magnitudes of the threats T1', T2', ..., Tm' are calculated in the same way as the threat T. Further, the other symbols are the same as those in the equation illustrated in FIG. 12. If the risk value of the present example is calculated, it will be |R|=0.79747152.

Figure 20:
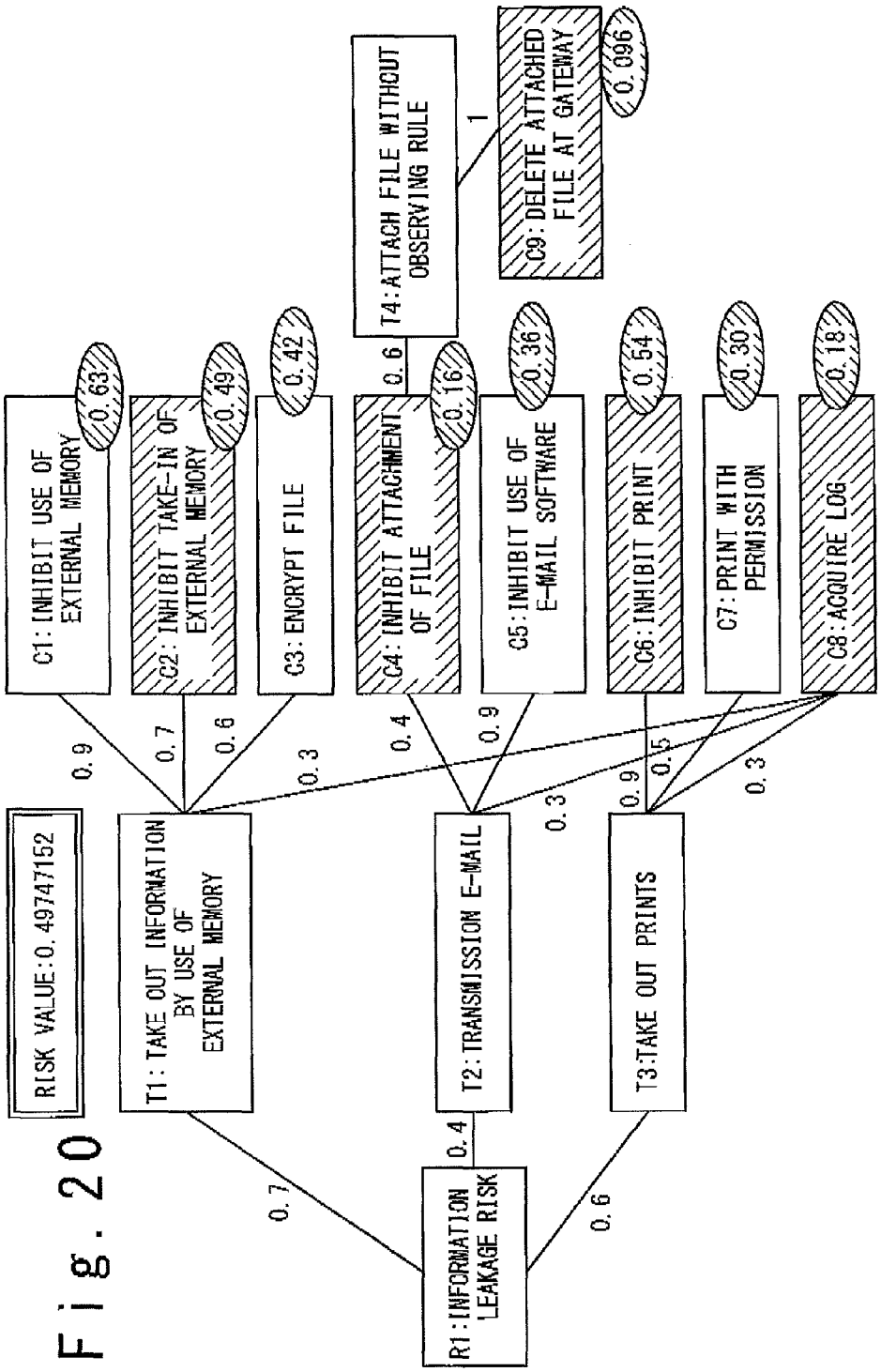
FIG. 20 is a diagram illustrating a calculation result of influence degrees in the extended risk model.

The influence degree calculating section 405 (see FIG. 7) calculates an influence degree in the extended risk model. A result of the influence degree calculation is illustrated as values inside ovals in FIG. 20. It should be noted that in FIG. 20, shaded measures C2, C4, C6, C8, and C9 represent measures having been implemented and practised. Then, similarly to the case of the first exemplary embodiment, the reason presenting section 406 (see FIG. 7) presents a reason. The model correction candidate extracting section 407 (see FIG. 7) extracts a model correction candidate. The model correction candidate is extracted in the same way as when the parameter adjustment candidate extracting section 207 extracts a parameter adjustment candidate in the first exemplary embodiment. A result of the extraction is illustrated in FIG. 21. The model correction candidate displaying section 408 (see FIG. 7) displays the model correction candidates exemplified in FIG. 21 to a risk analyst. The model correcting section 409 (see FIG. 7) can correct the extended risk model by treating each of the parameters in the same manner as in a case of the parameter adjusting section 209 in the first exemplary embodiment.

Further, in the present example, the model correction candidate displaying section 408 can also display a correction candidate for which a threat analysis may be insufficient. The correction candidate for which a threat analysis may be insufficient is a threat or a measure for which a risk value is considered to be calculated smaller than an actual value. When a threat analysis is insufficient, a threat may be overlooked, and a measure not in consideration of the threat may be implemented.

Figure 22:
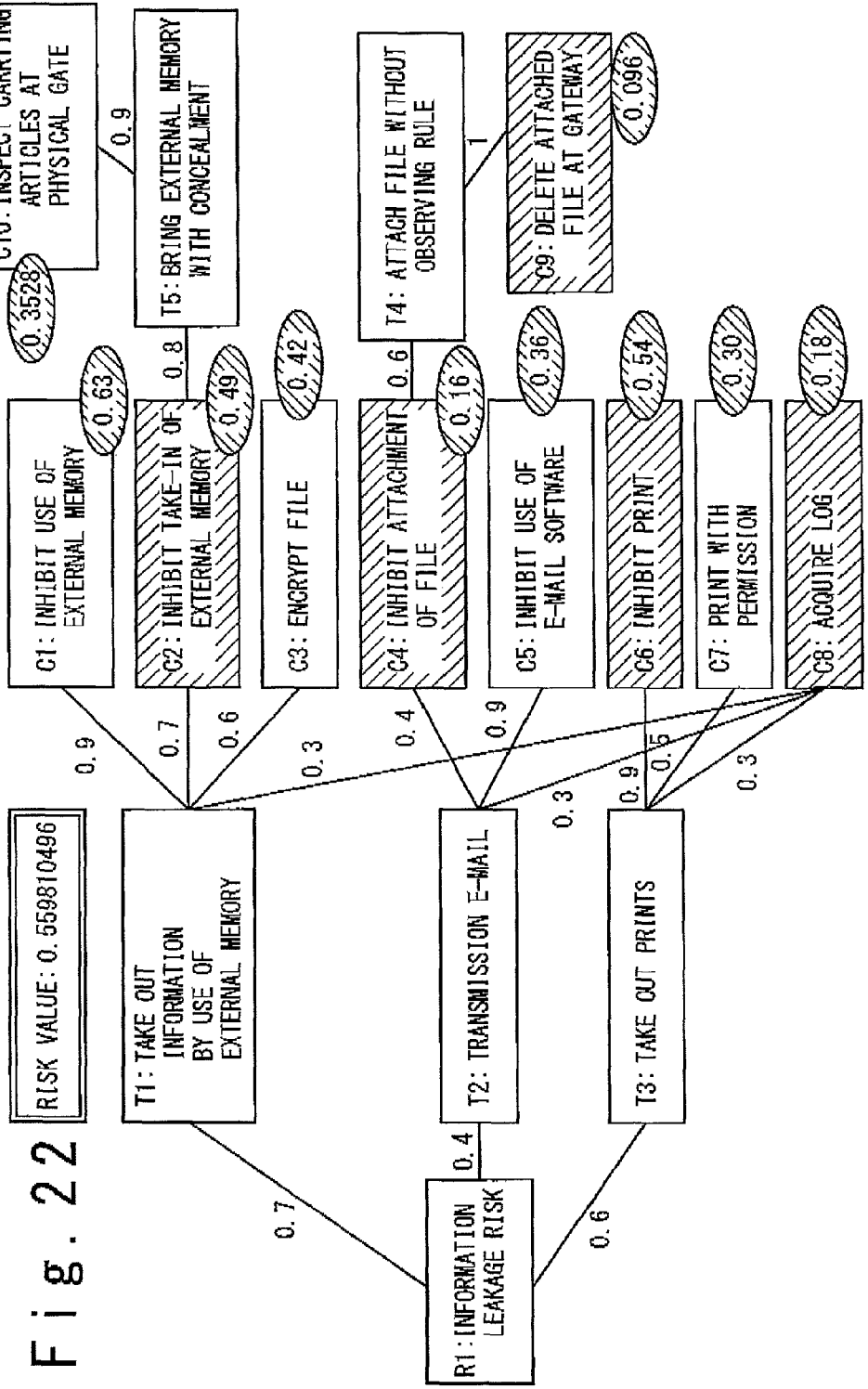
FIG. 22 is a diagram illustrating the extended risk model added with a threat and a measure.

That is, when the risk analyst determines that the risk value is calculated to be lower than the actual value, measures being implemented among the model correction candidates illustrates in FIG. 21 correspond to measures for which threat analyses are insufficient. Accordingly, the model correction candidate displaying section 408 presents the measures C2 and C6 respectively against the threats T1 and T3 as the measures for which threat analyses are insufficient. When the risk analyst views the presented measures to consider that the threat analyses are insufficient, he/she can add a threat. For example, when the threat analysis for the measure C2 "External memory is inhibited to be taken in" is insufficient; as a threat, there is "External memory is hidden behind"; and as a measure against the threat, "What is carried is checked at a physical gate" is considered to be present, the measure can be added by the model correcting section 409. The extended risk model added with the threat and measure is illustrated in FIG. 22.

Subsequently, because the extended risk model is corrected, the risk analyzing section 403 carries out the risk value calculation again. If the risk value is applied to the equation illustrated in FIG. 19 to calculate it, the risk value after the extended risk model correction will be 0.559810496. As described above, the influence degrees are calculated for the extended risk model to extract the model correction candidates, and thereby a portion for which the threat analysis is insufficient can be found out to correct the extended risk model, The risk model correcting system according to the present invention has: a risk model storage section that stores a risk model having a relationship between a threat and a measure that are used as criteria for a risk analysis, and parameters including weights of them; an information collecting section that collects data on an analysis target system; an influence degree calculating section that calculates an influence degree on a calculation of a risk value from the risk model; a risk analyzing section that calculates the risk value of the analysis target system by use of the risk model to thereby perform the risk analysis; and a reason presenting section that presents the influence degree calculated by the influence degree calculating section along with a result of the risk analysis by the risk analyzing section to thereby present a reason why the risk calculation is performed. By employing such a configuration, and presenting the calculation reason along with the risk analysis result, there is presented data by which it can be determined whether or not the calculated risk is correct.

Another aspect of the risk model correcting system according to the present invention has: a parameter adjustment candidate extracting section that extracts a parameter adjustment candidate on the basis of an influence degree calculated by influence degree calculating section, and an information collected by the information collecting section; an adjustment candidate displaying section that displays the adjustment candidate extracted by the parameter adjustment candidate extracting section; and a parameter adjusting section that adjusts a parameter of the adjustment candidate displayed by the adjustment candidate displaying section. By employing such a configuration, and extracting the candidate of which the parameter should be adjusted from a risk model on the basis of the influence degree and existence or non-existence of a measure to display it, there is provided a risk model correcting system that can calculate a risk value suitable for a state or environment of an analysis target system.

Still another aspect of the risk model correcting system according to the present invention has: a risk model storage section that stores a risk model having a relationship between a threat and a measure that are used as criteria for a risk analysis, and parameters including weights of them; an information collecting section that collects data on an analysis target system; an influence degree calculating section that calculates an influence degree on calculation of a risk value from the risk model; a risk analyzing section that calculates the risk value of the analysis target system by use of the risk model to thereby perform the risk analysis; a reason presenting section that presents the influence degree calculated by the influence degree calculating section along with a result of the risk analysis by the risk analyzing section to thereby present a reason why the risk calculation is performed; a model adjustment candidate extracting section that extracts an adjustment candidate for adjusting a structure of the risk model on the basis of an influence degree calculated by the influence degree calculating section and the data collected by the information collecting section; an adjustment candidate displaying section that displays the adjustment candidate extracted by the model adjustment candidate extracting section; and a model correcting section that adds a threat and a measure to the risk model according to the adjustment candidate displayed by the adjustment candidate displaying section. By employing such a configuration; extracting the candidate for the threat or measure to be corrected in the risk model based on the influence degree and the existence or non-existence of the measure; and correcting it if necessary, there is presented a risk model correcting system that corrects a risk model so as to calculate a risk value suitable for an analysis target system even in the case of the common risk model.

Yet another aspect of the risk model correcting system of the present invention is configured such that a risk model storage section stores an extended risk model added with a further threat against a measure. Based on such a configuration, there is provided a risk model correcting system that corrects a risk model so as to calculate a risk value suitable for an analysis target system even in a case of the common risk model by extracting, based on an influence degree and the existence or non-existence of the measure, a candidate for a threat or a measure for which a detailed risk analysis is required, and correcting it if necessary. The extended risk model in which a threat against a measure can be described can be used to calculate a risk value, and therefore there can be performed a detailed risk analysis in which an effect of the measure varies to suit an environment of a risk analysis target. Based on the extended risk model in which a threat against a measure can be described, the risk value is calculated; influence degree of each measure on the risk value is expressed as an influence degree; and a model correction candidate for which a threat analysis is considered to be insufficient is presented. If a reason why the risk value calculation is incorrect is that the threat analysis for a measure is insufficient, a risk analyst can add a threat or measure to the risk model.

As above, the present invention has been described referring to the exemplary embodiments and examples; however, the present invention is not limited to any of the above-described exemplary embodiments and examples. Various modifications can be made to the configurations and details of the present invention by a person skilled in the art within the scope of the present invention.

The invention claimed is:
1. A risk model correcting system comprising:
a risk model storing section comprising circuitry configured to store a correspondence relation of a group of threats of a risk, a parameter indicating a magnitude of each of the threats of the group, a group of measures for decreasing the threats, and a parameter indicating an effect of each of the measures as a risk model;
an information collecting section comprising circuitry configured to collect a measure adopted for an analysis target system as adoption measure data;
a risk analyzing section comprising circuitry configured to calculate a magnitude of the risk in said analysis target system as a risk value based on said risk model and said adoption measure data;
an influence degree calculating section comprising circuitry configured to calculate an influence degree of existence or nonexistence of the adopted measure on a calculation result of said risk value,
wherein the influence degree is calculated from a weigh of a threat and effect of a measure included in the risk model storing section;

a parameter adjustment candidate extracting section comprising circuitry configured to extract each of the threats or each of measures, for the parameter indicating a magnitude of each of the threats or indicating an effect of each of the measures to be adjusted, as a parameter adjustment candidate based on the influence degree, wherein the parameter adjustment candidate comprising circuitry extracting section extracts at least one of the measure being not practiced while the influence degree is high and the measure being practiced while the influence degree is low as said parameter adjustment candidate;

a reason displaying section comprising circuitry configured to display the parameter adjustment candidate; and a parameter adjusting section comprising circuitry configured to adjust the parameter related to each of the threats or each of the measures.

2. The risk model correcting system according to claim 1, further comprising:

a model adjustment candidate extracting section comprising circuitry configured to extract the threat or measure to be corrected, from the correspondence relation in said risk model as an adjustment candidate based on the influence degree and the adoption measure data; and a model correcting section comprising circuitry configured to correct each of the threats or measures extracted as said adjustment candidate.

3. The risk model correcting system according to claim 2, wherein said parameter adjusting candidate extracting section comprising circuitry extracts at least one of the measure being not practiced while the influence degree is high and the measure being practiced while the influence degree is low as said parameter adjustment candidate, and sets the extracted measure and the threat related to the extracted measure as said adjustment candidate.

4. The risk model correcting system according to claim 3, wherein said model adjustment candidate extracting section comprising circuitry sets a further measure related to the threat as the adjustment candidate in said adjustment candidate.

5. The risk model correcting system according to claim 1, wherein in said risk model, a further threat is related to the measure.

6. A risk model correcting method comprises:

storing a correspondence relation of a group of threats of a risk, a parameter indicating a magnitude of each of the threats of the group, a group of measures for decreasing the threats, and a parameter indicating an effect of each of the measures of the group, as a risk model;

collecting a measure adopted for an analysis target system as adoption measure data;

calculating a magnitude of the risk in said analysis target system as a risk value based on said risk model and said adoption measure data;

calculating an influence degree of existence or non-existence of the adopted measure on a calculation result of said risk value, wherein the influence degree is calculated from a weigh of a threat and effect of a measure included in the risk model;

extracting each of the threats or each of measures, for the parameter indicating a magnitude of each of the threats or indicating an effect of each of the measures to be adjusted, as a parameter adjustment candidate based on the influence degree;

displaying the extracted parameter adjustment candidate; and adjusting the parameter related to the threat or the measure; wherein the method is executed by a processor.

7. The risk model correcting method according to claim 6, wherein said extracting as a parameter adjustment candidate comprises:

extracting at least one of the measure being not practiced while the influence degree is high and the measure being practiced while the influence degree is low, as said parameter adjustment candidate.

8. The risk model correcting method according to claim 6, further comprising:

extracting the threat or the measure to be corrected, as an adjustment candidate from the correspondence relation of said risk model based on the influence degree and said adoption measure data; and correcting the threat or the measure extracted as said adjustment candidate.

9. The risk model correcting method according to claim 8, wherein said extracting as an adjustment candidate comprises:

extracting at least one of the measure being not practiced while the influence degree is high and the measure being practiced while the influence degree is low as said parameter adjustment candidate; and setting the extracted measure and the threat related to the extracted measure as said adjustment candidate.

10. The risk model correcting method according to claim 9, wherein said setting comprises:

setting a further measure related to the threat as the adjustment candidate in said adjustment candidate.

11. The risk model correcting system according to claim 6, wherein said storing said risk model comprises:

relating a further threat to the measure, to the measure as an extended risk model.

12. A risk model correcting program stored in a non-transitory computer readable medium and executed by a computer, the risk model correcting program comprising:

storing a correspondence relation among a group of threats of a risk, a parameter indicating a magnitude of each of the threats of the group, a group of measures for decreasing the threats, and a parameter indicating an effect of each of the measures of the group, as a risk model;

collecting a measure adopted for an analysis target system as adoption measure data;

calculating a magnitude of the risk in said analysis target system as a risk value based on said risk model and said adoption measure data;

calculating an influence degree of existence or non-existence of the adopted measure on a calculation result of said risk value, wherein the influence degree is calculated from a weigh of a threat and effect of a measure included in the risk model;

extracting each of the threats or each of measures, for the parameter indicating a magnitude of each of the threats or indicating an effect of each of the measures to be adjusted, as a parameter adjustment candidate based on the influence degree;

displaying the extracted parameter adjustment candidate; and adjusting the parameter related to the threat or the measure.

13. The risk model correcting program according to claim 12, wherein said extracting as a parameter adjustment candidate comprises:

extracting at least one of the measure being not practiced while the influence degree is high and the measure being practiced while the influence degree is low, as said parameter adjustment candidate.

14. The risk model correcting program according to claim 12, further comprising:

extracting the threat or the measure to be corrected, as an adjustment candidate from the correspondence relation of said risk model based on the influence degree and said adoption measure data; and correcting the threat or the measure extracted as said adjustment candidate.

15. The risk model correcting program according to claim 14, wherein said extracting as an adjustment candidate comprises:

extracting at least one of the measure being not practiced while the influence degree is high and the measure being practiced while the influence degree is low as said parameter adjustment candidate; and setting the extracted measure and the threat related to the extracted measure as said adjustment candidate.

16. The risk model correcting program according to claim 15, wherein said setting comprises:

setting a further measure related to the threat as the adjustment candidate in said adjustment candidate.

17. The risk model correcting program according to claim 12, wherein said storing said risk model comprises:

relating a further threat to the measure, to the measure as an extended risk model.

\* \* \* \* \*

UNITED STATES PATENT AND TRADEMARK OFFICE
CERTIFICATE OF CORRECTION

| | | |
|---|---|---|
| PATENT NO. | : 8,844,029 B2 | Page 1 of 1 |
| APPLICATION NO. | : 12/599773 | |
| DATED | : September 23, 2014 | |
| INVENTOR(S) | : Hiroshi Sakai | |

It is certified that error appears in the above-identified patent and that said Letters Patent is hereby corrected as shown below:

In The Claims

Column 20, Line 34: In Claim 11, delete "system" and insert -- method --, therefor Signed and Sealed this
Twenty-eighth Day of April, 2015

Michelle K. Lee
*Director of the United States Patent and Trademark Office*